US012617619B2

(12) United States Patent
Austrheim et al.

(10) Patent No.: US 12,617,619 B2
(45) Date of Patent: May 5, 2026

(54) CONTAINER HANDLING MODULE

(71) Applicant: Autostore Technology AS, Nedre Vats (NO)

(72) Inventors: Trond Austrheim, Etne (NO); Amund Skålerud, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 403 days.

(21) Appl. No.: 18/249,624

(22) PCT Filed: Nov. 22, 2021

(86) PCT No.: PCT/EP2021/082455
§ 371 (c)(1),
(2) Date: Apr. 19, 2023

(87) PCT Pub. No.: WO2022/112153
PCT Pub. Date: Jun. 2, 2022

(65) Prior Publication Data
US 2023/0382646 A1     Nov. 30, 2023

(30) Foreign Application Priority Data

Nov. 27, 2020     (NO) .................................. 20201310

(51) Int. Cl.
B65G 1/137          (2006.01)
B65G 1/04           (2006.01)

(52) U.S. Cl.
CPC ......... B65G 1/1378 (2013.01); B65G 1/0485 (2013.01)

(58) Field of Classification Search
CPC .. B65G 1/1378; B65G 1/0485; B65G 47/244; B65G 1/0464; B65G 35/06; B65G 54/02;
(Continued)

(56) References Cited

U.S. PATENT DOCUMENTS 4,003,461 A      1/1977 Speaker et al.
12,428,226 B2 *  9/2025 Millward .................. B66C 7/08
(Continued)

FOREIGN PATENT DOCUMENTS

DE          103 09 818 A1     9/2004
DE     10 2014 119 110 A1     6/2016
(Continued)

OTHER PUBLICATIONS

Alexander Thenert, Examination Report for European Application No. 21819380.3-1017, mailed Sep. 3, 2024, 5 pages, European Patent Office, Rijswijk, Netherlands.
(Continued)

*Primary Examiner* — Jacob S. Scott
*Assistant Examiner* — Miraj T. Patel
(74) *Attorney, Agent, or Firm* — Baker Botts L.L.P.

(57)                ABSTRACT

A container handling module for an access station in a storage system includes a first container holder, a second container holder, a shuttle, and a rail assembly. The first and second container holders are rotatably mounted to the shuttle via a rotary shaft. Each of the first and second container holders is arranged to accommodate a storage container and is rotatable around an axis of rotation between a first angular position and a second angular position. The second angular position is opposite the first angular position relative to a centreline of the rotary shaft. The shuttle is configured for linear movement in a horizontal direction between a first linear position and a second linear position relative to the rail assembly.

24 Claims, 17 Drawing Sheets

(58) Field of Classification Search
CPC ............ B65G 2201/0235; B65G 1/026; B65G
1/0471; B65G 1/06
See application file for complete search history.

(56) References Cited

U.S. PATENT DOCUMENTS

| | | | |
|---|---|---|---|
| 2017/0369247 | A1 | 12/2017 | Bouche et al. |
| 2023/0382646 | A1 | 11/2023 | Austrheim et al. |

FOREIGN PATENT DOCUMENTS

| | | | |
|---|---|---|---|
| EP | 3 713 855 | A1 | 9/2020 |
| EP | 4251546 | B1 | 6/2025 |
| JP | S6048829 | A | 3/1985 |
| NO | 317366 | B1 | 10/2004 |
| NO | 344742 | B1 | 3/2020 |
| WO | 2012/026824 | A1 | 3/2012 |
| WO | 2014/075937 | A1 | 5/2014 |
| WO | 2014/090684 | A1 | 6/2014 |
| WO | 2015/140216 | A1 | 9/2015 |
| WO | 2015/193278 | A1 | 12/2015 |
| WO | 2016/120375 | A1 | 8/2016 |
| WO | 2018/146304 | A1 | 8/2018 |
| WO | 2019076516 | A1 | 4/2019 |
| WO | 2019/101725 | A1 | 5/2019 |
| WO | 2020/117874 | A1 | 6/2020 |

OTHER PUBLICATIONS

International Search Report issued in corresponding International Application No. PCT/EP2021/082455, mailed on Feb. 28, 2022 (5 pages).

Written Opinion issued in corresponding International Application No. PCT/EP2021/082455, mailed on Feb. 28, 2022 (9 pages).

Search Report issued in counterpart Norwegian Patent Application No. 20201310 mailed on Jun. 24, 2021 (2 pages).

Thenert, Alexander, Extended European Search Report for European patent application No. EP24212245.5, dated Feb. 13, 2025, 9 pages, published by the European Patent Office, Munich, Germany.

Le Huy Anh, Notice of Office Action for Vietnamese Patent Application No. 1-2023-04175, dated Feb. 28, 2025, 4 pages, pub. by The Intellectual Property Office of Vietnam, Hanoi, Vietnam.

Anh, Le Huy, Office Action in VN1202304175, mailed Nov. 18, 2025, 4 pages, Intellectual Property Office of Vietnam, Hanoi, Vietnam.

Li, Yu, Examining action in Chinese patent application 202180079834. 4, mailed Dec. 8, 2025, 22 pages, The State Intellectual Property Office of the People's Republic of China, Beijing, China.

Rognan, Tove Kathrine, Office Action in Norwegian patent application 20201310, mailed Feb. 16, 2026, 4 pages, Norwegian Industrial Property Office, Oslo, Norway.

* cited by examiner

13a

13b

14

CONTAINER HANDLING MODULE

FIELD OF THE INVENTION

The present invention relates to container handling module, an access station comprising a container handling module and a storage system comprising such an access station.

BACKGROUND AND PRIOR ART

FIG. 1 discloses a typical prior art automated storage and retrieval system 1 with a framework structure 100 and FIGS. 2 to 4 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged in a grid pattern across the top of the framework structure 100, on which rail system 108 a plurality of container handling vehicles 201,301 are operated to raise storage containers 106 from, and lower storage containers 106 into, the storage columns 105, and also to transport the storage containers 106 above the storage columns 105. The horizontal extent of one of the grid cells 122 constituting the grid pattern is marked by thick lines.

The rail system 108 (i.e. a rail grid) comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a container lifting assembly 2 (shown in FIG. 4) for vertical transportation of storage containers 106, e.g. raising a storage container 106 from, and lowering a storage container 106 into, a storage column 105. The container lifting assembly 2 comprises a lifting frame 3 having one or more gripping/engaging devices 4 adapted to engage a storage container 106 and guide pins 304 for correct positioning of the lifting frame 3 relative to the storage container 106. The lifting frame 3 can be lowered from the vehicle 201,301 by lifting bands 5 so that the position of the lifting frame with respect to the vehicle 201,301 can be adjusted in a third direction Z which is orthogonal the first direction X and the second direction Y.

The lifting frame 3 (not shown) of the container handling vehicle 201 in FIG. 2 is located within a cavity of the vehicle body 201a.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station 6 where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising e.g. belt or roller conveyors may be employed to transport the storage containers between the port columns 119,120 and the access station If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

Belt and/or roller conveyors are relatively expensive and often service intensive. To avoid use of such conveyors, some access stations may have a section arrangeable directly below a port column such that a storage container may be transferred directly to the access station. Prior art access stations suitable for being arranged below a port column are disclosed in for example WO 2012/026824 A1 and WO 2016/120375 A1. The prior art access stations may move a storage container from a position below a port column to a picking/stocking position (or access position) by a radial movement around a rotational axis. An operator has access to the content of the storage container at the picking/stocking position. Due to the space required for performing the radial movement, the minimum width of the prior art access stations at the picking/stocking position is about twice the width of a storage container. Thus, the radial movement of the prior art access stations disclosed in WO 2012/026824 A1 and WO 2016/120375 A1 may in some cases be disadvantageous. For instance, multiple picking/stocking positions may not be arranged adjacent to each other, since the access stations have a relatively large footprint at the outside of the framework structure and the positioning of the picking position relative to the port column is quite inflexible. Further, the placement of the prior art access stations is somewhat inflexible since the distance from a port column to a picking/stocking position is set by the extent of the radial movement.

The access station disclosed in WO 2016/120375 A1 features a storage container holder and a complex guide mechanism for tilting the storage container holder towards an operator to provide an ergonomically improved work position.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

An object of the present invention is to provide an improved access station, wherein at least some of the disadvantages of the prior art access stations utilizing a radial movement of the container holders are alleviated or minimized.

SUMMARY OF THE INVENTION

The present invention is defined by the attached claims and in the following:

In a first aspect, the present invention provides a container handling module for an access station in a storage system, the container handling module comprises a first container holder, a second container holder, a shuttle and a rail assembly, the first and second container holders are rotatably mounted to the shuttle via a rotary shaft, wherein each of the first and second container holders is arranged to accommodate a storage container and is rotatable around an axis of rotation between a first angular position and a second angular position, the second angular position being opposite the first angular position relative to a centreline of the rotary shaft, and the shuttle being configured for linear movement in a horizontal direction between a first linear position and a second linear position relative to the rail assembly.

The first and second container holders may be in the form of a tray. In other embodiments, the container holders may feature a belt or roller conveyor allowing a storage container to be loaded on/off a container holder in a horizontal direction, e.g. to/from an external conveyor system. The first and second container holders may have the same shape and configuration, arranged opposite one another relative to the centreline of the rotary shaft.

In an embodiment of the container handling module, the rail assembly may comprise two parallel rails and a support framework, i.e. a framework for supporting the rails.

In an embodiment of the container handling module, the first and second container holders extend laterally beyond the parallel rails during rotation between the first and second angular position.

In an embodiment of the container handling module, the first and second container holders extend further laterally beyond the parallel rails during rotation between the first and second angular position than in the first and second angular position.

In an embodiment of the container handling module, the shuttle may be configured for linear movement in a horizontal direction between a first linear position and a second linear position relative to the rail assembly, such that the first or second container holder arranged in the first angular position, when the shuttle is in the first linear position, may be moved by the shuttle to occupy a space corresponding to a space that was occupied by the first or second container holder arranged in the second angular position when the shuttle was in the first linear position, without rotation around the axis of rotation.

In an embodiment of the container handling module, the shuttle may be configured for linear movement in a horizontal direction between a first linear position and a second linear position relative to the rail assembly, such that the placement of any of the first and second container holders in the first angular position and the second angular position may be moved relative to the rail assembly.

In an embodiment of the container handling module, the shuttle may comprise a set of wheels in contact with the rail assembly and configured to allow movement of the shuttle in the horizontal direction between the first linear position and the second linear position relative to the rail assembly. In other words, the set of wheels may be configured to move the shuttle and the first and second container holders in the horizontal direction.

In an embodiment of the container handling module, each of the two parallel rails may have a cross-section comprising guide surfaces, the guide surfaces arranged to interact with the shuttle to restrict vertical movement of the shuttle relative to the rail assembly. In other words, the guide surfaces are arranged to prevent or restrict tilting of the shuttle relative to the rails and/or framework. The guide surfaces may be longitudinal and parallel to the rails. The guide surfaces may for instance interact with the set of wheels, ribs or recesses on the shuttle, and/or ribs or recesses on the wheel shafts of the set of wheels. The guide surfaces comprises at least a downwards facing surface.

In an embodiment of the container handling module, each of the two parallel rails may have a cross-section comprising guide surfaces provided by an upper flange and a lower flange for interaction with the set of wheels, the upper and lower flanges are arranged to restrict vertical movement of the set of wheels relative to the rail assembly. They may also help to restrict lateral movement perpendicular to the direction of travel of the container handling module, to help guide forward and back movement of the container handling module. The upper flange comprises a downwards facing guide surface.

In an embodiment of the container handling module, the shuttle may move between a first end and a second end of the rail assembly.

In an embodiment of the container handling module, the first or second container holder being in the first angular position may be arranged at the first end of the rail assembly when the shuttle is in the first linear position. The length of the horizontal movement of the shuttle between the first linear position and the second linear position may be at least equal to a minimum extent of the first or the second container holder in the horizontal plane.

In an embodiment of the container handling module, either the first or the second container holder being in the first angular position is arranged at the first end of the rail assembly when the shuttle is in the first linear position.

In an embodiment of the container handling module, the first angular position is arranged between the first end of the rail assembly and the axis of rotation.

In an embodiment of the container handling module, either the first or the second container holder arranged in the first angular position may be closer to the first end of the rail assembly than the other of the first or the second container holder arranged in the second angular position, i.e. when the shuttle is in a set linear position.

In an embodiment of the container handling module, the shuttle may move linearly for a distance being at least equal to a horizontal distance between the axis of rotation and a distal portion of the first container holder or the second container holder. In other words, the linear movement of the shuttle may extend for a distance being at least equal to a horizontal distance between the axis of rotation and a distal portion of the first container holder or the second container holder.

In an embodiment of the container handling module, the length of the rail assembly in the horizontal direction may be at least three times a horizontal distance between the axis of rotation and a distal portion of either the first container holder or the second container holder. In a further embodiment, the length of the rail assembly in the horizontal direction may be at least four times a horizontal distance between the axis of rotation and a distal portion of the first container holder or the second container holder.

In an embodiment of the container handling module, the distance between the first linear position and the second linear position may be at least equal to a horizontal distance between the axis of rotation and a distal portion of either the first container holder or the second container holder. In a further embodiment, the distance may be at least equal to twice the horizontal distance between the axis of rotation and a distal portion of the first container holder or the second container holder. The distal portion is intended to mean the portion of the first and second container holders being furthest removed from the axis of rotation.

In an embodiment of the container handling module, the first container holder may be arranged opposite of the second container holder relative to the axis of rotation. In other words, the first and second container holders may be positioned on opposite sides of the axis of rotation, such that the first or second container holder is in the first angular position when the other container holder is in the second angular position.

In an embodiment, the container handling module may comprise a first electric motor arranged to rotate the first and second container holders around the axis of rotation and/or a second electric motor arranged to move the shuttle between the first linear position and the second linear position. The second electric motor may be arranged to rotate at least one wheel of the set of wheels. The rotation of the at least one wheel of the set of wheels may be obtained by rotational engagement of the wheel to the second electric motor or by having the second electric motor arranged to move the shuttle in a linear direction.

In an embodiment of the container handling module, the shuttle may move to at least one intermediate linear position arranged between the first linear position and the second linear position.

In an embodiment of the container handling module, the axis of rotation may be inclined at a first angle relative to a vertical, and each of the first container holder and the second container holder is configured such that a centreline of an accommodated storage container when supported by the respective container holder is inclined at a second angle relative to the axis of rotation, wherein the centreline of an accommodated storage container is vertical when in the second angular position and inclined at a third angle relative to the vertical when in the first angular position, the third angle being equal to the sum of the first angle and the second angle.

The centreline of a storage container is intended to define a line being perpendicular to a plane of the storage container bottom and intersecting the centre of said bottom. Alternatively, the centreline of a storage container may be defined as the central axis of the storage container. When supported on a container holder arranged in the second angular position, a centreline of the storage container may extend perpendicular to a horizontal line extending between the first and second angular positions.

In an embodiment of the container handling module, the centreline of a storage container may coincide with a centreline of the first or second container holder on which the storage container is accommodated. In other words, the axis of rotation may be inclined at a first angle relative to a vertical, and each of the first container holder and the second container holder is configured such that a centreline of the respective container holder is inclined at a second angle relative to the axis of rotation, wherein the centreline of any of the first and second container holder is vertical when in the second angular position and inclined at a third angle relative to the vertical when in the first angular position, the third angle being equal to the sum of the first angle and the second angle.

In other words, when the axis of rotation is inclined, any of the first and second container holders may rotate/orbit 180 degrees about the axis of rotation between a second angular position, wherein an accommodated storage container is horizontal, i.e. has an opening facing directly upwards, and a first angular position, wherein an accommodated storage container is inclined at the third angle relative to the vertical, i.e. has an opening facing upward and inclined at the third angle relative to the vertical. The first angle may be substantially equal to the second angle. In the present specification, the term "substantially equal" is intended to mean that the size of the first angle differs from the size of the second angle by less than 25%, and preferably less than 10%.

In an embodiment of the container handling module, the first angle and the second angle may each be within a range of 2-10 degrees, 3-8 degrees or 4-7 degrees.

In an embodiment of the container handling module, the centreline of a storage container accommodated in either the first or second container holder may be inclined relative to a vertical when the respective container holder is in the first angular position, such that an opening of the storage container will face away from the axis of rotation. In other words, when the container holder is in the first angular position, a top opening of an accommodated storage container may be inclined in order to face an operator when the container handling module is part of an access station.

In an embodiment of the container handling module, the axis of rotation may be inclined towards the first end of the rail assembly.

In an embodiment of the container handling module, the centreline of a storage container accommodated by the first or second container holder may be gradually inclined from the vertical to the third angle during an arcuate movement between the second angular position and the first angular position.

In a second aspect, the present invention provides an access station comprising at least one container handling module according to any embodiment of the first aspect, wherein the container handling module is arranged to present a storage container at an access position of the access station, at which access position an operator or robot may have access to the storage container when the storage container is supported by either the first or the second container holder being in the first angular position and the shuttle is in the first linear position. In other words, either of the first or the second container holders may be arranged at an access position, when the respective container holder is in the first angular position and the shuttle is in the first linear position.

In an embodiment of the access station, the container handling module is arranged to allow a storage container to be provided to or retrieved from either of the first or the second container holder, when the respective container holder is in the second angular position and the shuttle is in the second linear position. In other words, any of the first and second container holders may be arranged at a storage container loading/unloading position, when the respective container holder is in the second angular position and the shuttle is in the second linear position.

In an embodiment of the access station, the container handling module may be arranged to allow a storage container to be provided to or retrieved from the first or the second container holder, when the respective container holder is in the second angular position and the shuttle is in any of the first linear position and the second linear position.

In an embodiment of the access station, the first and second container holder may rotate around the axis of rotation when the shuttle is in the second linear position. In other words, the first and second container holder have room or space to rotate around the axis of rotation at least when the shuttle is in the second linear position.

In an embodiment, the access station may comprise a cabinet within which the first end of the rail assembly of the at least one container handling module is arranged, the cabinet comprises an access opening arranged to be aligned with the access position.

In an embodiment, the access station may comprise a first container handling module and a second container handling module, wherein the rail assemblies of the first and second container handling modules are arranged in parallel, or perpendicular to each other, to provide two adjacent access positions.

In an embodiment, the access station may be configured for a storage system featuring at least one port column, through which port column storage containers may be transferred in a vertical direction, and wherein the access station comprises a station framework configured for supporting the lower end of the at least one port column above the rail assembly. In other words, the station framework is configured such that a storage container may be provided or retrieved from any of the first and second container holders via the at least one port column, when the respective container holder is in the second angular position and the shuttle is in any of the first linear position and the second linear position depending on which linear position the at least one port column is arranged above. The station framework may comprise horizontal beams, e.g. lintels, upon which the lower end of the at least one port column is supported. The framework may also comprise vertical uprights for supporting the horizontal beams. The station framework is configured to support the lower end of the at least one port column at a level above an upper level of a storage container arranged on any of the first and second container holders.

In an embodiment, the access station may be configured for a storage system having a plurality of port columns, and the station framework is configured for supporting the lower ends of the plurality of port columns above the rail assembly. In other words, the station framework is configured for supporting the lower ends of the plurality of port columns at separate port column positions arranged above and along the rail assembly. Each of the separate port column positions may be aligned with a respective container holder position that may be occupied by the first or second container holder depending on the angular position of the container holder and the linear position of the shuttle.

In an embodiment of the access station, the first container holder and the second container holder of the first container handling module may rotate around the axis of rotation when the shuttle of the first container handling module is in the second linear position and the shuttle of the second container handling module is in the first linear position.

In an embodiment of the access station, the station framework is arranged to provide sufficient space for rotation of the first container holder and the second container holder of the at least one container handling module around the axis of rotation when the shuttle of the at least one container handling module is in the second linear position. The framework may in some embodiments provide sufficient space for rotation of the first container holder and the second container holder of the at least one container handling module around the axis of rotation when the shuttle of the at least one container handling module is in the first linear position In a third aspect, the present invention provides a storage system comprising an access station according to any embodiment of the second aspect, wherein the storage system features at least one port column through which port column storage containers may be transferred in a vertical direction, the at least one port column is arranged above the rail assembly of the at least one container handling module of the access station such that a storage container may be delivered to, or retrieved from, the first or second container holder via the port column when the first or second container holder is arranged in the second angular position and the shuttle is in the second linear position.

In an embodiment, the storage system may comprise a plurality of port columns arranged above the rail assembly of the at least one container handling module of the access station such that a storage container may be delivered to, or retrieved from, the first or second container holder via a port column when the first or second container holder is arranged in the second angular position and the shuttle is in any of the first linear position and the second linear position. The plurality of port columns, for example, arranged in a row and comprising, say, two, three or four port columns, may allow different types of container handling vehicles to use the access station, for example, cantilever-style container handling vehicles with cantilevers extending in different directions as well as allowing multiple container handling vehicles to drop off storage containers to or retrieve storage containers from the access station at the same time.

In an embodiment of the storage system, the shuttle of the at least one container handling module may move to at least one intermediate linear position arranged between the first linear position and the second linear position, wherein the storage system comprises a plurality of port columns arranged above the rail assembly of the at least one container handling module such that a storage container may be delivered to, or retrieved from, the first or second container holder when the first or second container holder is arranged in the second angular position and the shuttle is in any of the intermediate linear position and the second linear position.

In an embodiment of the storage system, the storage system or the access station may comprise a station framework configured for supporting the lower ends of the plurality of port columns above the rail assembly.

In an embodiment, the storage system comprises vertical column profiles defining a plurality of grid columns, the grid columns comprise storage columns in which storage containers can be stored one on top of another in vertical stacks, and at least one of the grid columns is a port column, each of the grid columns being defined by four vertically extending column profiles, and the column profiles are interconnected at their upper ends by top rails forming a horizontal top rail grid (or rail system) of the storage grid. The storage system may comprise a plurality of container handling vehicles arranged upon the top rail grid and configured to transfer storage containers from and to the top rail grid via the port columns.

In a fourth aspect, the present invention provides a method of exchanging a storage container at an access position of an access station according to any embodiment of the second aspect, comprising the steps of:

presenting a first storage container at the access position by having the first storage container supported on the first container holder of the at least one container holder module, the first container holder arranged in the first angular position, and the shuttle arranged in the first linear position;

moving the shuttle to the second linear position and loading a second container holder onto the second container holder arranged in the second angular position;

rotating the first and second container holders around the axis of rotation to arrange the first container holder in the second angular position and the second container holder in the first angular position;

optionally unloading the first storage container from the first container holder; and moving the shuttle to the first linear position and presenting the second storage container at the access position.

In a fifth aspect, the present invention provides a method of presenting a storage container for access at an access station according to any embodiment of the second aspect, comprising the steps of:

moving the shuttle of a first container handling module to the second linear position (i.e. to its second linear position), while the shuttle of a second container handling module is in the first linear position (i.e. in its first linear position);

loading the storage container onto the first or second container holder, of the first container handling module, being in the second angular position;

rotating the first and second container holders of the first container handling module around the axis of rotation to move the first or second container holder, on which the storage container is loaded, to the first angular position; and moving the shuttle of the first container handling module to the first linear position and presenting the storage container at a first access position.

The first and second linear positions, between which the shuttle of the first container handling module may move, may be arranged adjacent to the respective first and second linear positions, between which the shuttle of the second container handling module may move.

In an embodiment, the method according to the fifth aspect may comprise the further steps of:

moving the shuttle of a second container handling module to the second linear position, while the shuttle of the first container handling module is in the first linear position;

loading a further storage container onto the first or second container holder, of the second container handling module, being in the second angular position;

rotating the first and second container holders of the second container handling module around the axis of rotation to move the first or second container holder, on which the further storage container is loaded, to the first angular position; and moving the shuttle of the second container handling module to the first linear position and presenting the further storage container at a second access position.

In a sixth aspect, the present invention provides a method of presenting a storage container for access at an access station according to any embodiment of the second aspect, comprising the steps of:

moving the shuttle of the at least one container handling module to the second linear position;

loading the storage container onto the first container holder or the second container holder being in the second angular position;

rotating the first container holder and the second container holder around the axis of rotation to move the first or second container holder, on which the storage container is loaded, to the first angular position; and moving the shuttle to the first linear position and presenting the storage container at the access position.

The term "access station" is in the present disclosure intended to mean an assembly of at least one container handling module according to the first aspect of the invention, i.e., a station where one or more than one points of access are provided to storage containers, wherein the contents of a storage container may be picked, wherein a storage container may be stocked with additional content, and any combination thereof.

BRIEF DESCRIPTION OF THE DRAWINGS

Embodiments of the invention is described in detail by reference to the following drawings.

DETAILED DESCRIPTION OF THE INVENTION

Figure 1:
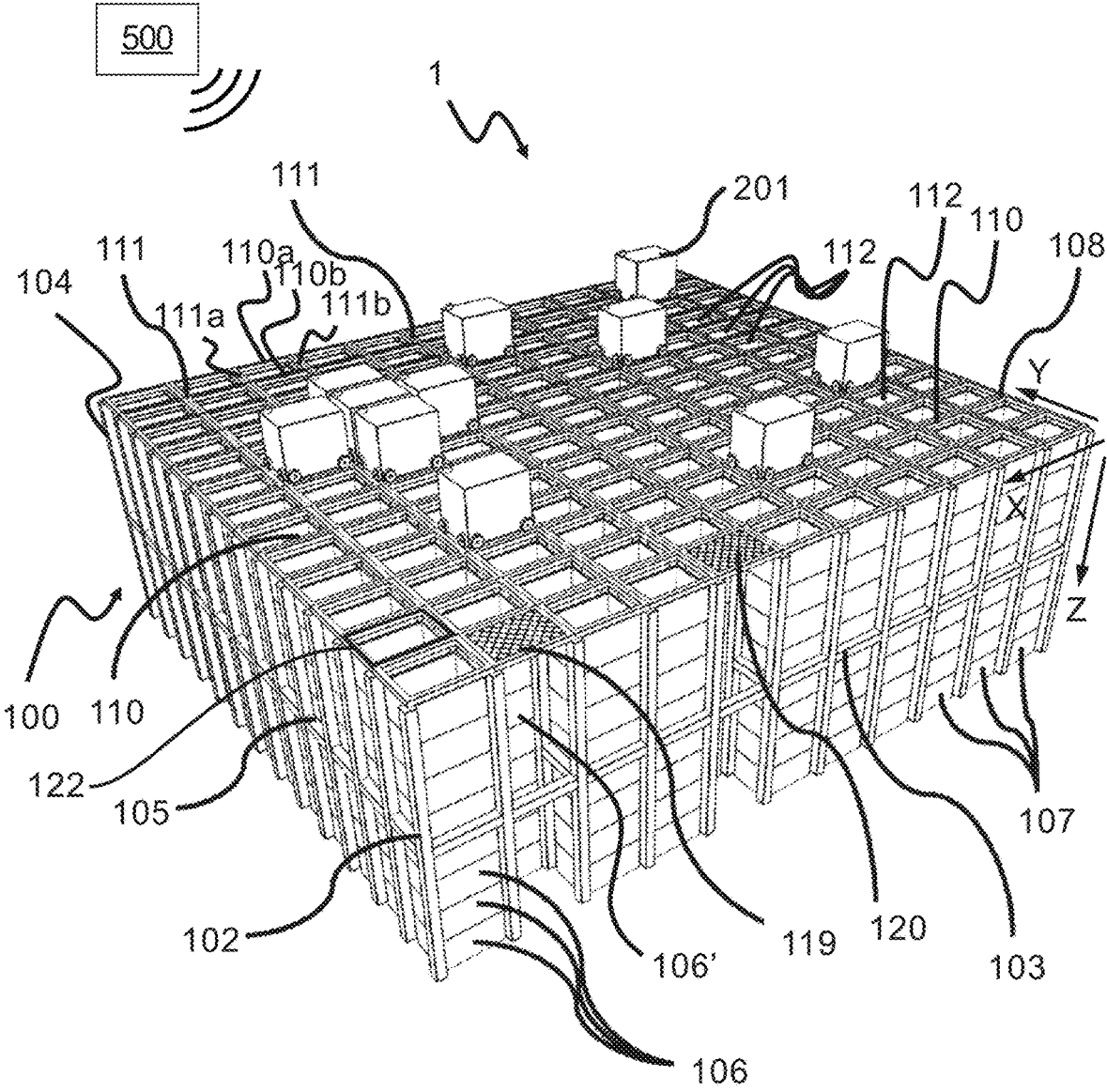
FIG. 1 is a perspective view of a framework structure of a prior art automated storage and retrieval system.
Figure 2:
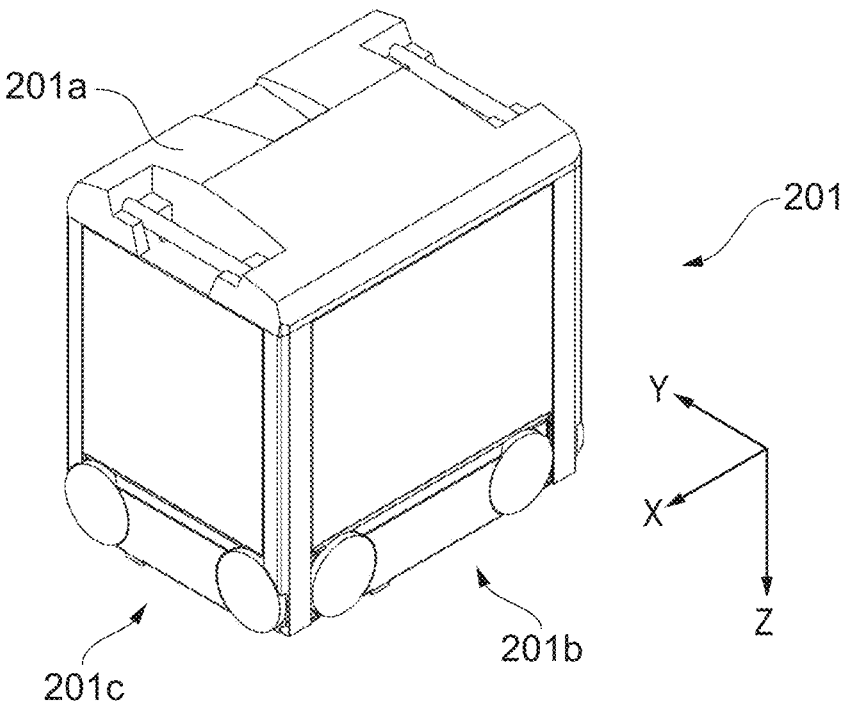
FIG. 2 is a perspective view of a prior art container handling vehicle having a centrally arranged cavity for carrying storage containers therein.
Figure 3:
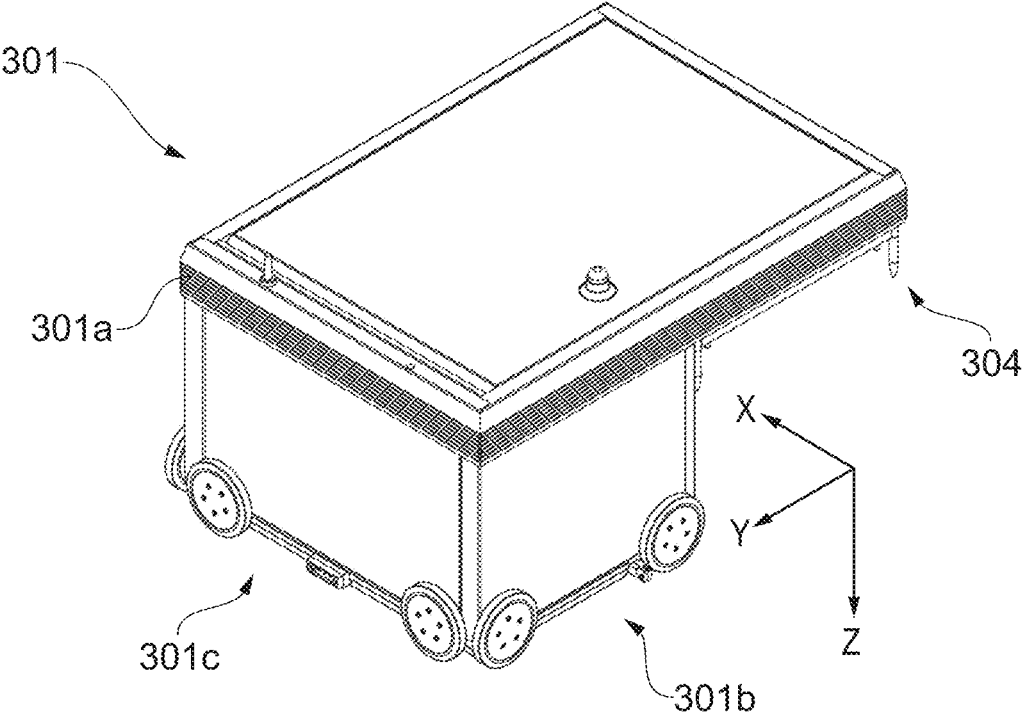
FIG. 3 is a perspective view of a prior art container handling vehicle having a cantilevered section for carrying storage containers underneath.
Figure 4:
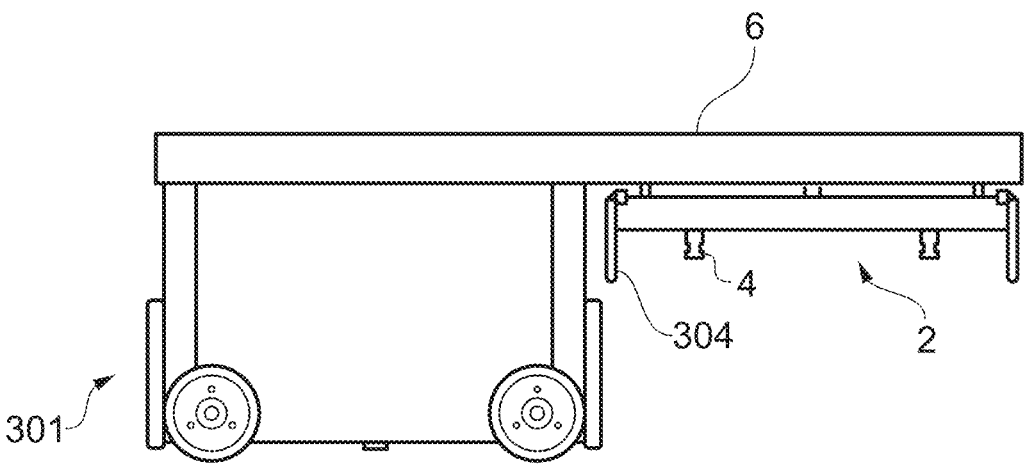
FIG. 4 are side views of the container handling vehicle in FIG. 3, wherein a lifting device is shown.
Figure 4:
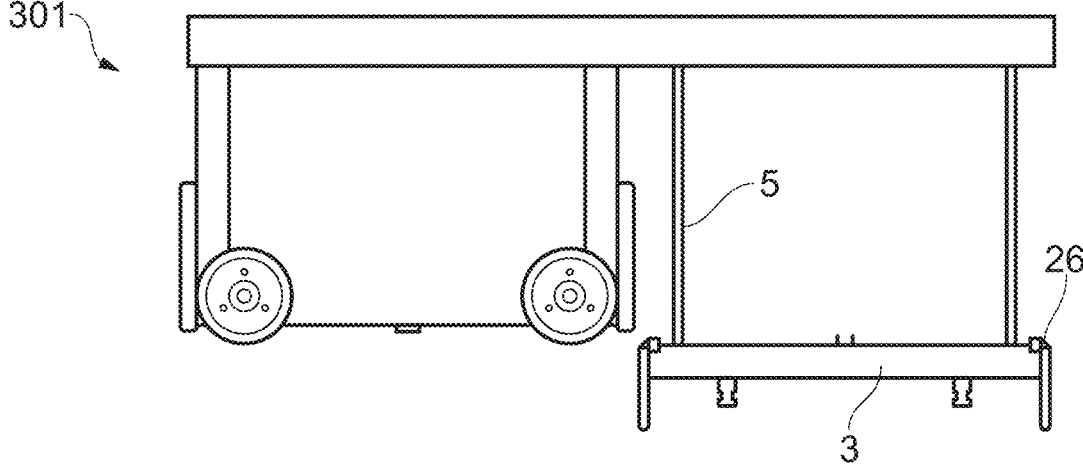
Figure 5:
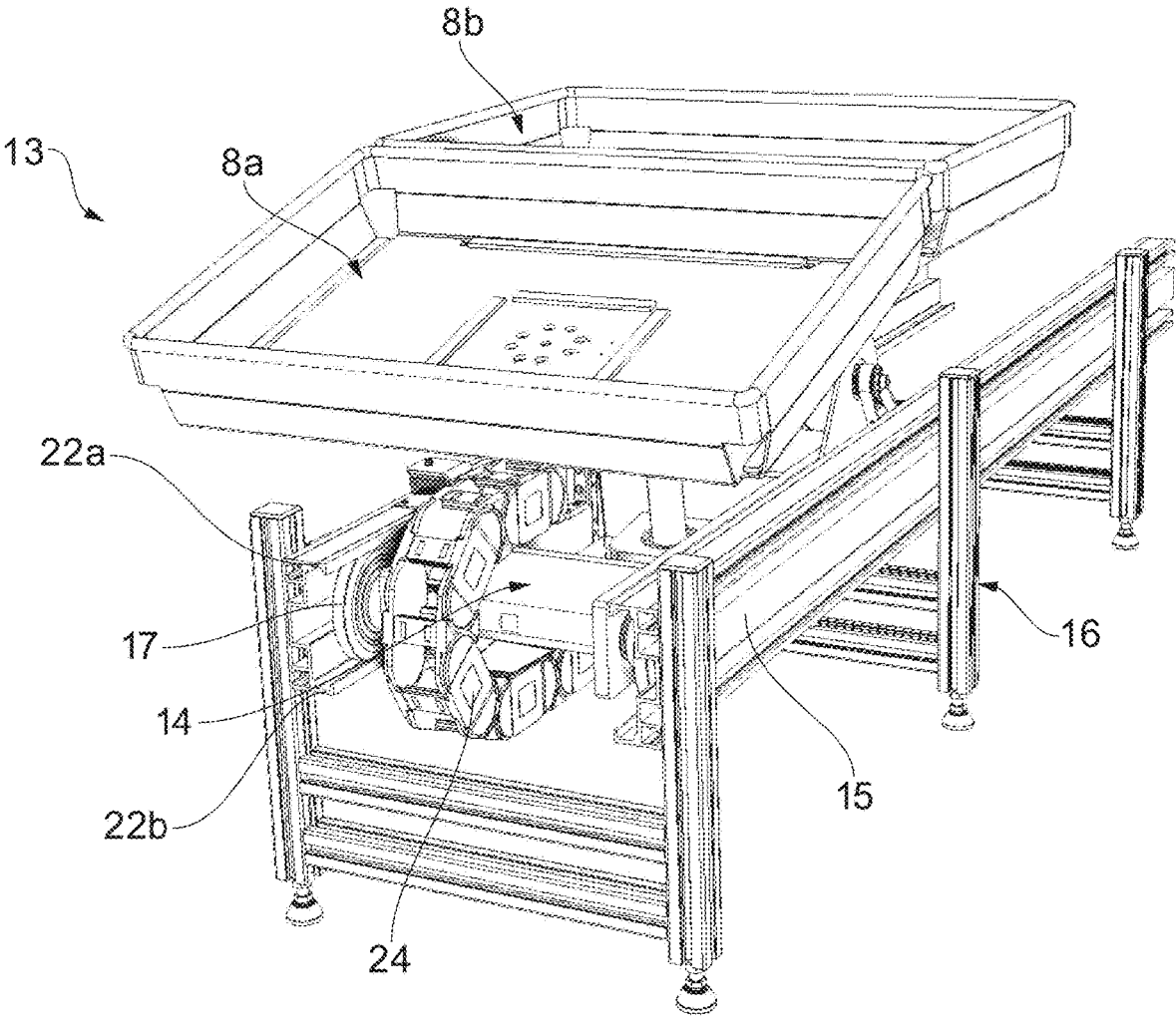
FIG. 5 is a perspective view of a first exemplary container handling module according to the invention.

In the following, embodiments of the invention will be discussed in more detail with reference to the appended drawings. However, the drawings are not intended to limit the invention to the subject-matter depicted in the drawings.

The inventive container handling module and access station were developed for use in a prior art storage system as shown in FIG. 1 and described in detail above. However, both the container handling module and access station may advantageously be used in any type of container handling system, including various container storage systems, wherein access to a container is required.

Figure 9:
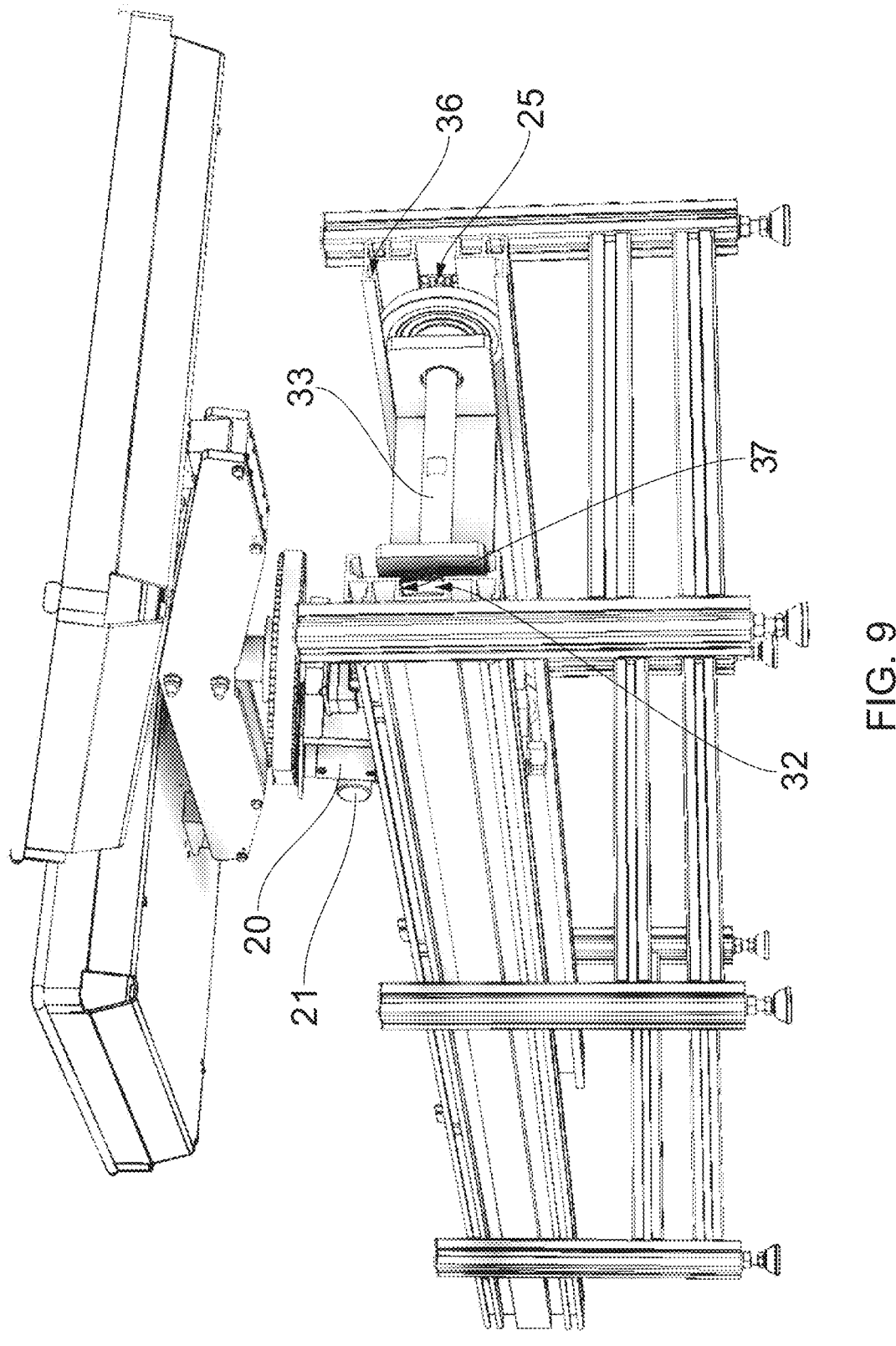
FIG. 9 is a perspective view of a second exemplary container handling module according to the invention.

A first exemplary container handling module 13 according to the invention is shown in FIGS. 5-8 and a second exemplary container handling module 13' is shown in FIG. 9. The container handling modules are suitable for use in storage system access stations. In an access station, a storage container may be transferred between a delivery/retrieval position at which the storage container may be delivered to or retrieved from the access station and an access position wherein a picker, i.e. a human operator or robot, may access the storage container.

The container handling module 13 comprises a first container holder 8a, a second container holder 8b, a shuttle 14 and a rail assembly featuring two parallel rails 15 and a support framework 16. The first and second container holders 8a,8b are rotatably mounted to the shuttle 14 via a rotary shaft 9. Each of the first and second container holders 8a,8b is arranged to accommodate a storage container 106, see FIG. 10, and is rotatable around an axis of rotation C between a first angular position P1 and a second angular position P2. The second angular position P2 is opposite of the first angular position P1 relative to a centreline C of the rotary shaft 9. The first container holder 8a is arranged opposite of the second container holder 8b relative to the axis of rotation C, such that the first container holder 8a is in the first angular P1 position when the second container holder 8b is in the second angular position P2.

The shuttle 14 has a set of wheels 17 in contact with the two parallel rails 15 and is configured to allow linear movement of the shuttle 14 in the horizontal direction H between a first linear position L1 at a first end 8 of the rail assembly 15,16, at least one intermediate linear position L2' and a second linear position L2 at a second end of the rail assembly 15,16, i.e. the shuttle 14 may move linearly relative to the rail assembly.

When one of the first and second container holders 8a,8b is arranged in the first angular position P1 the respective container holder is arranged at or close to the first end 18 of the rail assembly when the shuttle 14 is in the first linear position L1.

The rail assembly 15,16 and shuttle 14 are configured to allow a first or second container holder arranged in the second angular position P2 to be moved linearly between two distinct positions relative to the rail assembly 15,16, i.e. the horizontal periphery of the first container holder arranged in a first distinct position will not overlap with the horizontal periphery of the first container holder arranged in a second distinct position. In the embodiment shown in FIGS. 5-8, the distance between two distinct positions, e.g. the first linear position L1 and the intermediate linear position L2', is about equal to the distance between the axis of rotation C and a distal edge 35 (i.e. a distal portion) of any of the first container holder 8a and the second container holder 8b.

In the exemplary embodiment, the container holders 8a,8b are in the form of trays configured to support the bottom of a storage container. The trays are connected to the rotary shaft 9 by an angled beam 31. The trays may also be configured to restrict transverse movement of the storage container relative to the trays. In other embodiments, the container holders may for instance be similar to the ones disclosed in WO 2019/076516 A1. Each of the container holders may also be rotatable about an internal axis as shown in WO 2012/026824 A1. In further alternate embodiments, the container holders may e.g. feature a belt or roller conveyor configured to transport a storage container on/off the container holder in a horizontal direction.

To enable stable rotation of the first and second container holders 8a,8b around the axis of rotation C, each of the two parallel rails 15 has a cross-section comprising an upper flange 22a, having a downwards facing guide surface 36, and a lower flange 22b for interaction with the set of wheels 17, the upper and lower flanges 22a,22b are arranged to restrict vertical movement of the set of wheels relative to the rail assembly. This feature is highly advantageous when the loads on the oppositely arranged container holders are uneven. Without the upper flanges 22a, i.e. guide surfaces, a narrow shuttle as disclosed in the present invention would easily tilt or tip over during rotation of the container holders between the first and second angular position.

To enable the required rotational and linear movements, the container handling module may feature a first electric motor 20 configured to rotate the first and second container holders 8a,8b around the axis of rotation C. Further, a second electric motor 21 may be arranged to rotate at least one wheel of the set of wheels 17. Alternative embodiments are envisioned, wherein the second electric motor may be separate from the shuttle, e.g. arranged or connected at a section of the rail assembly to move the shuttle via a suitable drive band or linear actuator. The rotary shaft 9 is operatively connected to the electrical motor 20 via a drive band 11. Other arrangements for connecting the rotary shaft 9 to an electrical motor are envisioned, for example, by gears or by use of direct drive motors. Electric power for driving the first electric motor 20 and/or the second electric motor 21 is provided by a power cable arranged within cable protector drag chain 24.

Figure 6:
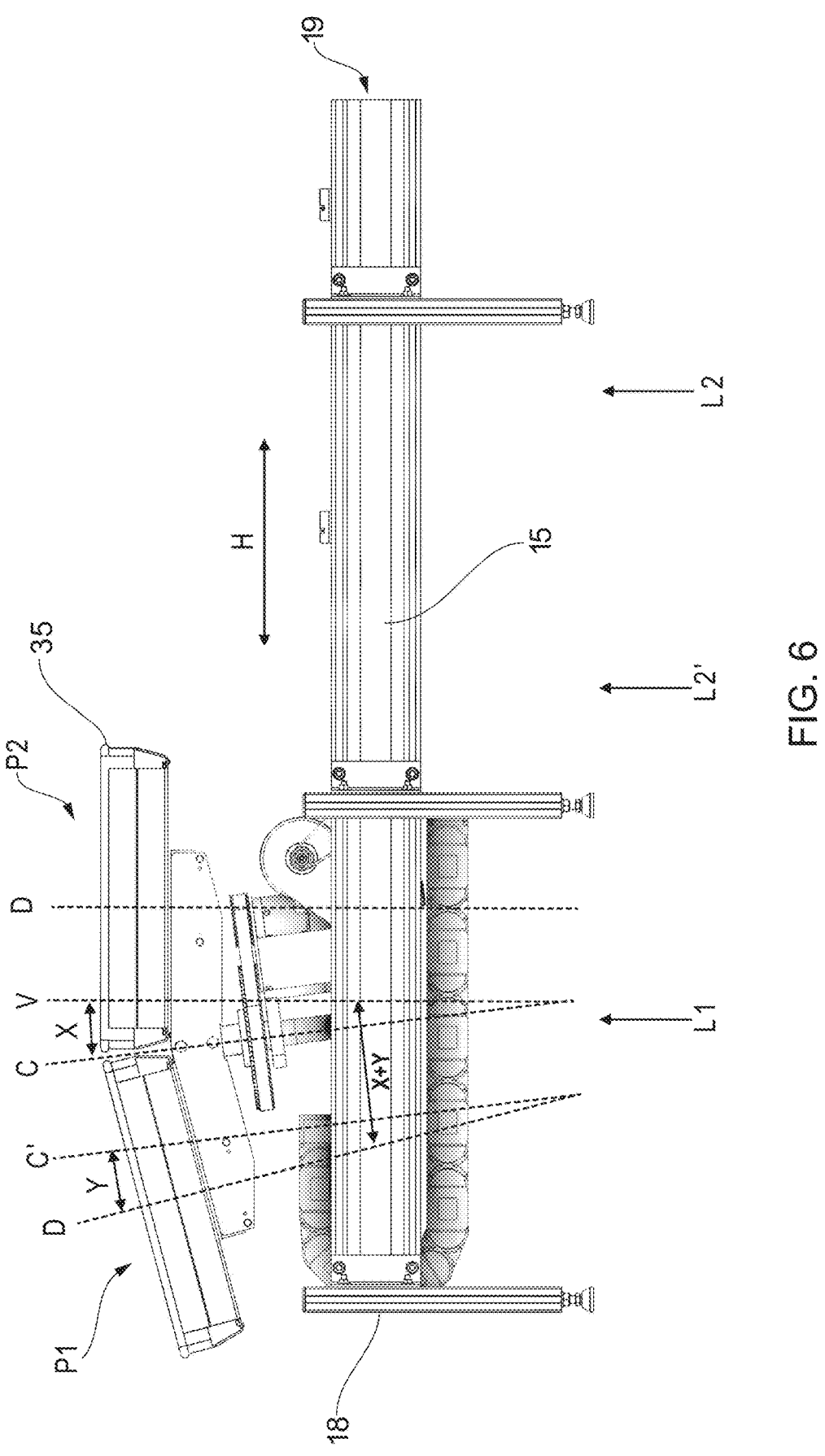
FIG. 6 is a side view of the container handling module in FIG. 5.
Figure 7:
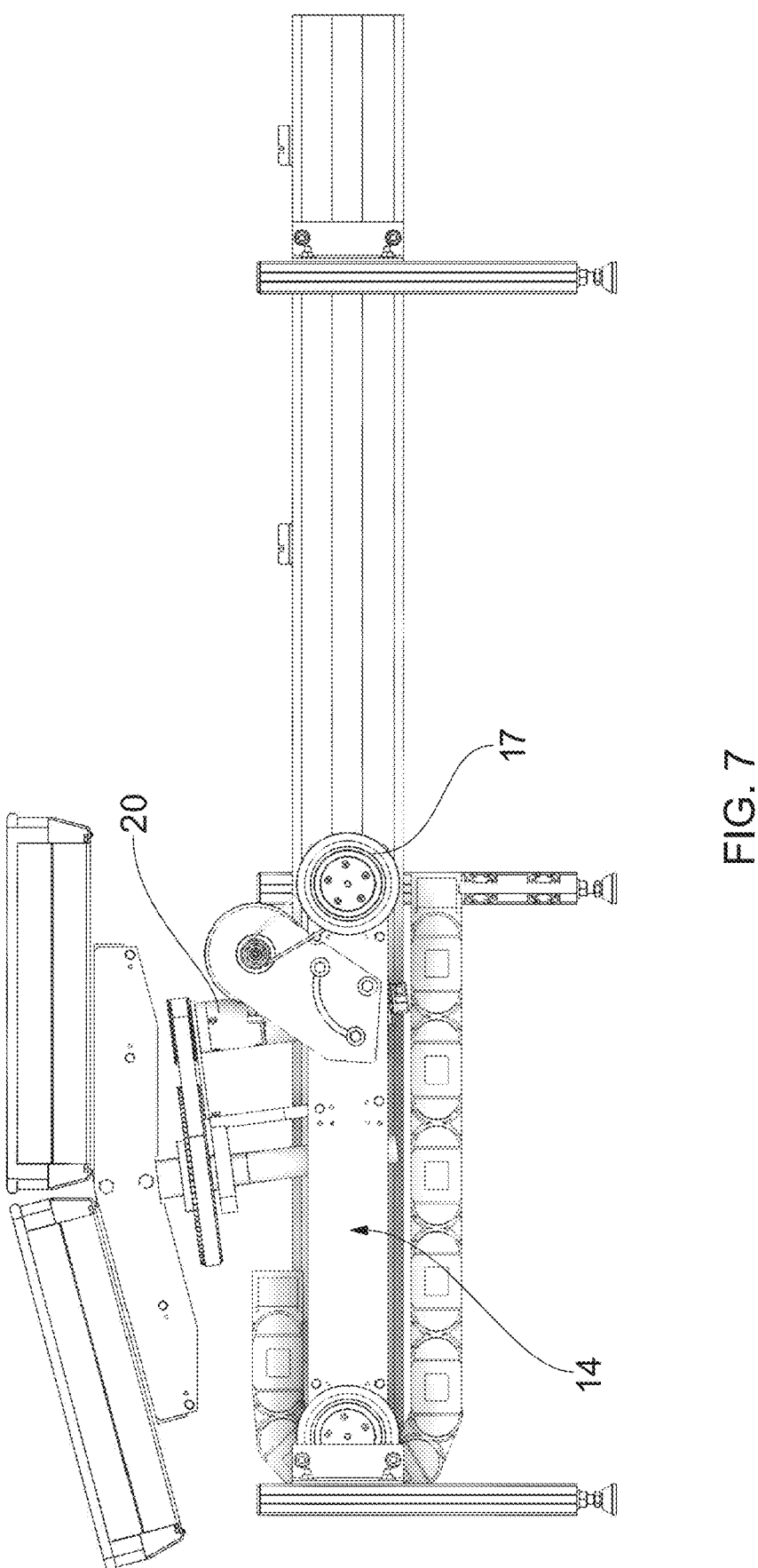
FIG. 7 is a side view of the container handling module in FIG. 5.
Figure 8:
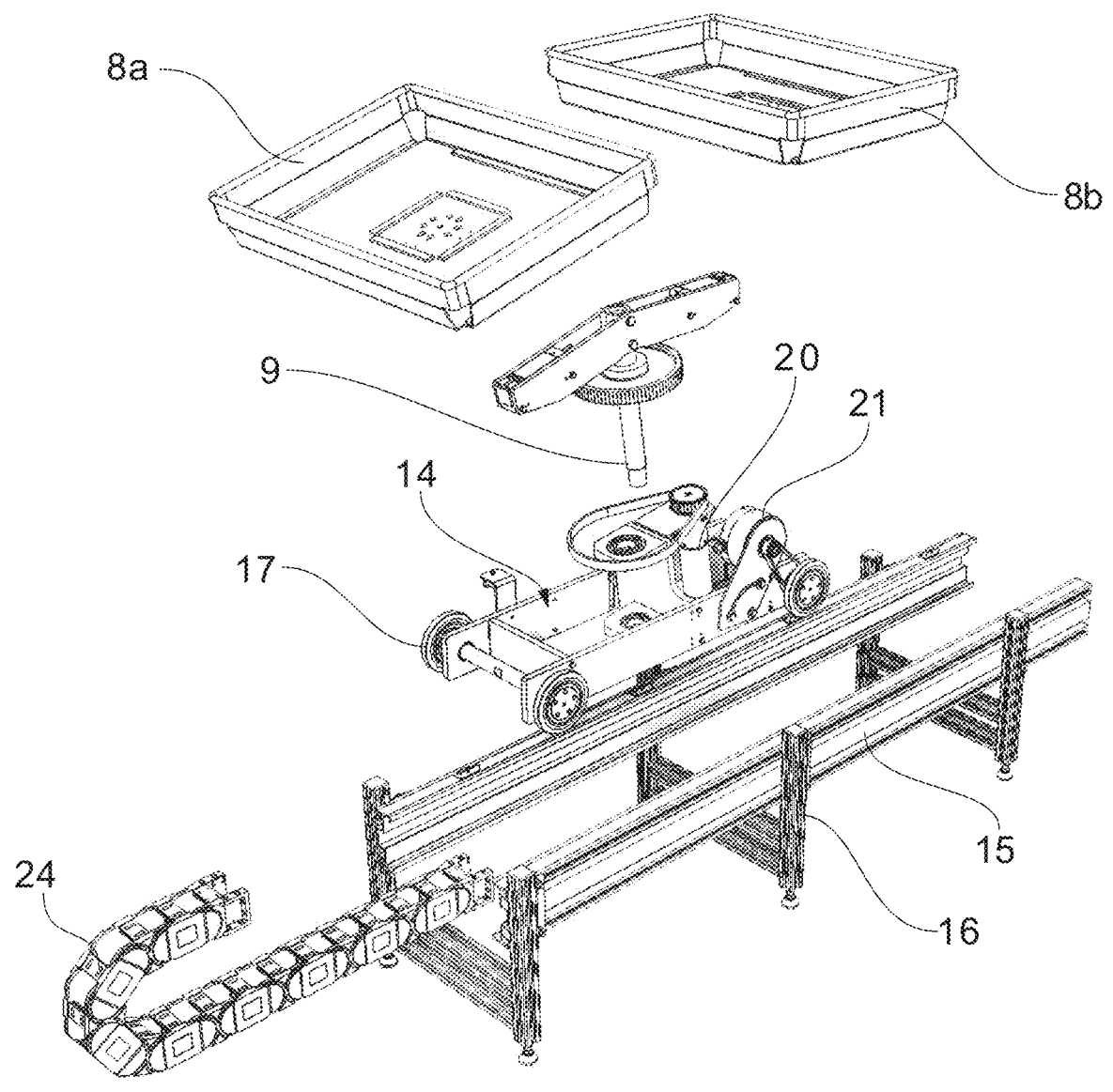
FIG. 8 is an exploded view of the container handling module in FIG. 5.

The axis of rotation C, or the centreline of the rotary shaft 9, may be inclined at a first angle X with respect to the vertical V, see FIG. 6. The first and the second container holders 8a,8b are configured, and/or inclined, such that a centreline of an accommodated storage container 106 is inclined at a second angle Y relative to the axis of rotation C. In the exemplary embodiment, the centreline of an accommodated storage container will coincide with the centreline D of the respective container holder. The second angle Y is such that an opening of a storage container will face away from the axis of rotation C. In this specification, the centreline of a storage container 106 is a line being perpendicular to a plane of the storage container bottom and intersecting the centre of said bottom.

The result of having the axis of rotation C and the container holders 8a,8b configured, and/or inclined, such that an accommodated storage container is inclined at the respective first angle X and second angle Y is that a storage container is held horizontally when accommodated by a container holder in the second angular position P2 and inclined in the direction of the first end 18 of the rail assembly by an angle of X+Y (i.e. a third angle) when in the first angular position P1.

In the illustrated embodiment, the first angle X and the second angle Y are both 5 degrees, and the third angle is consequently 10 degrees. In other embodiments, the first angle X and the second angle Y will preferably be within the range of 1 to 10 degrees.

A common feature of the illustrated container holders is the presence of at least one container support surface upon which an accommodated storage container is supported, e.g. a bottom support surface 30 of the tray structure. The support surface(s) 30 will commonly be arranged in a support plane being parallel to the plane of the bottom of an accommodated storage container 106. A line being perpendicular to the support plane will consequently be inclined at the same angle relative to the axis of rotation C as the centreline of an accommodated storage container. The inclination of the container holders, or the inclination of the support plane, may also be defined in relation to a radial plane perpendicular to the axis of rotation C by use of the second angle Y.

A second exemplary container holder module 13' is shown in FIG. 9. The differentiating feature of the container handling module compared to the embodiment in FIGS. 5-8 is the way electric power is provided to the first and second electric motor 20,21. In many applications it can be advantageous to increase the distance between an access position and a delivery/retrieval position. In the container handling modules according to the invention, the distance is decided by the length of the rail assembly 15,16 and the distance the shuttle 14 may travel upon the rail assembly 15,16. In the first exemplary container holder module 13, the travel distance of the shuttle 14 is restricted by the practical length of the cable protector drag chain 24. To allow for an even longer travel distance of the shuttle 14, power to the electric motors 20,21 of the second exemplary container holder module can be provided via contacts 25 on the rails and cooperating contacts 32 connected to e.g. a wheel shaft 33 of the shuttle 14. In this way the travel distance of the shuttle is only restricted by efficiency considerations due to the increased travel time of the shuttle from a distal delivery/retrieval position to an access position, i.e. from the second linear position L2 to the first linear position L1. Structural elements making up the cooperating contacts 32 may also interact with guide surfaces 37 of the rails to restrict tilting of the shuttle.

Figure 10:
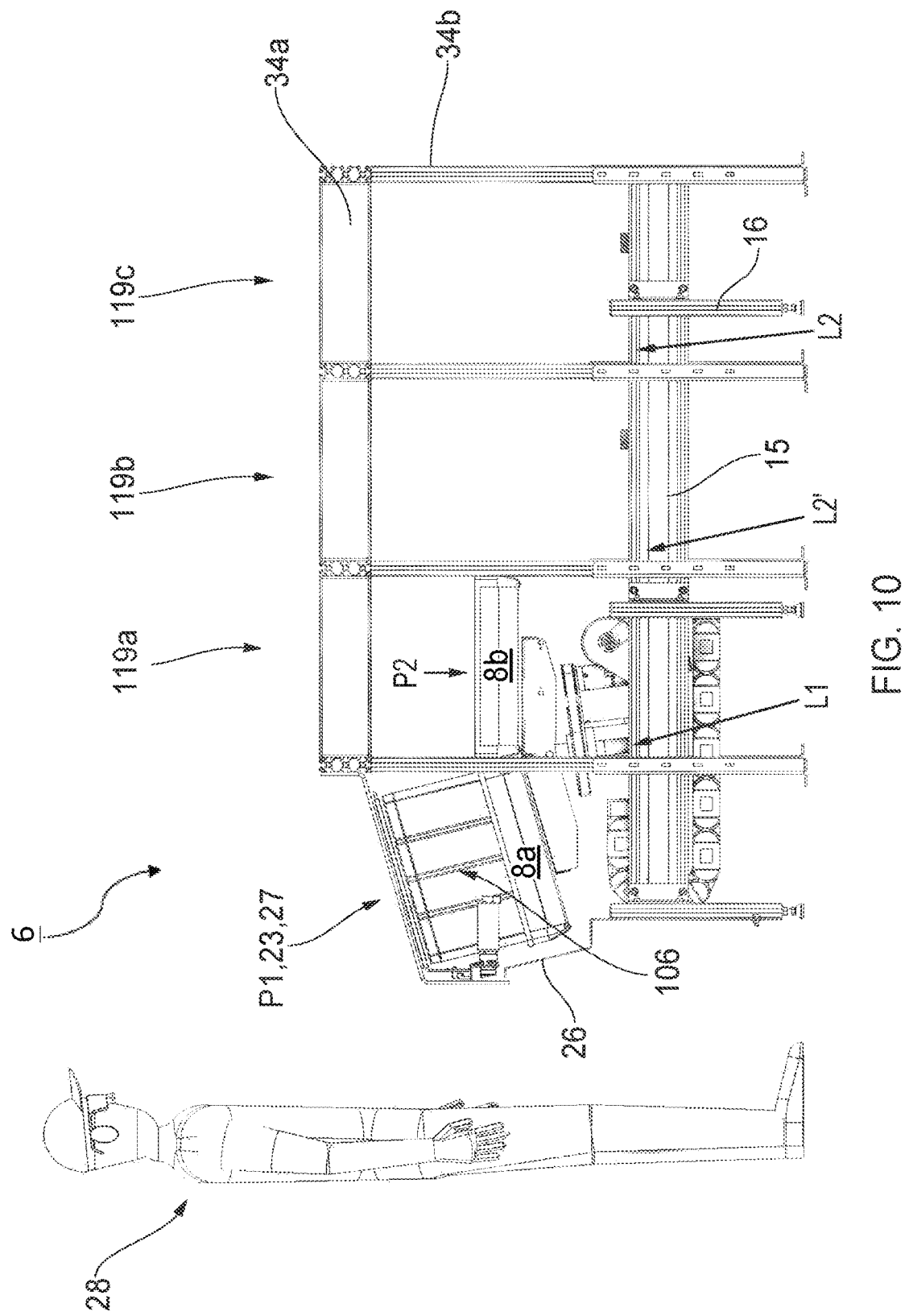
FIG. 10 is a side view of a first exemplary access station according to the invention comprising the container handling module in FIGS. 5-8.

An access station featuring the first exemplary container handling module 13 is shown in FIG. 10. The access station is configured for use with a storage system as shown in FIG. 1, and described above, and features a station framework 34 and a cabinet 26 with an access opening 27. A first end 18 of the rail assembly 15,16 is arranged within the cabinet 34 such that a storage container 106 may be aligned with the access opening 27 when the shuttle 14 (FIG. 8) is in the first linear position L1 and the storage container 106 is supported by one of the container holders 8a,8b arranged in the first angular position P1.

The shuttle 14 may move between a first linear position L1, an intermediate linear position L2' and a second linear position L2. The station framework is configured to support the lower ends of three port columns 119a-c arranged above the rail assembly 15,16. In this manner, a storage container 106 may be provided or retrieved from any of the first and second container holders 8a,8b via one of the three port columns 119a-c, when the respective container holder is in the second angular position P2 and the shuttle 14 is in any of the first linear position L1, the intermediate linear position L2' and the second linear position L2.

The station framework 34 is configured to allow room for rotation of the first and second container holder 8a,8b around the axis of rotation C at least when the shuttle 14 is in the second linear position L2. The station framework may comprise lintels in the form of horizontal beams 34a upon which the lower end of at least one port column 119a-c of the storage system may be supported. Vertical uprights 34b may be used for supporting the horizontal beams 34a. The horizontal beams are configured to support the lower end of the port column at a level above an upper level of a storage container 106 arranged on any of the first and second container holder 8a.8b.

A section of a storage system 1' featuring an access station according to the invention is shown in FIGS. 11-14. The access station is similar to the one shown in FIG. 10 except that it comprises a second exemplary container handling module 13' as shown in FIG. 9.

The storage system features a first port column 119a, a second port column 119b and a third port column 119c, and each port column 119a-c has a lower end supported by the station framework 34 above the rail assembly 15,16.

By using a plurality of port columns 119a-c, a storage container 106 may be delivered to, or retrieved from, the first or second container holder 8a,8b, via one of the port columns when the first or second container holder 8a,8b is arranged in the second angular position P2 and the shuttle 14 is in any of the first linear position L1, the intermediate linear position L2' and the second linear position L2.

Although the station framework 34 is shown as part of the access station in FIG. 10, the station framework 34 may also be defined as a part of the framework structure 102,108 of the storage system itself. The footprint or width of the access station outside the framework structure 102.108 may be smaller than in the prior art access stations since the rotation of the container holders 8a,8b may be performed inside the framework structure. It is noted that the loss of storage space inside the framework structure due to the space required for rotation of the container holders is minimal since the columns arranged above the station framework are either port columns 119 or storage columns 105 (see FIG. 1). The storage columns 105 supported by the station framework are provided with container stoppers (not shown) at their lower ends, such that each storage column 105 may accommodate a stack of storage containers above the station framework.

FIGS. 11-14 illustrates an exemplary method of operating an access station (or storage system) according to the invention.

Figure 11:
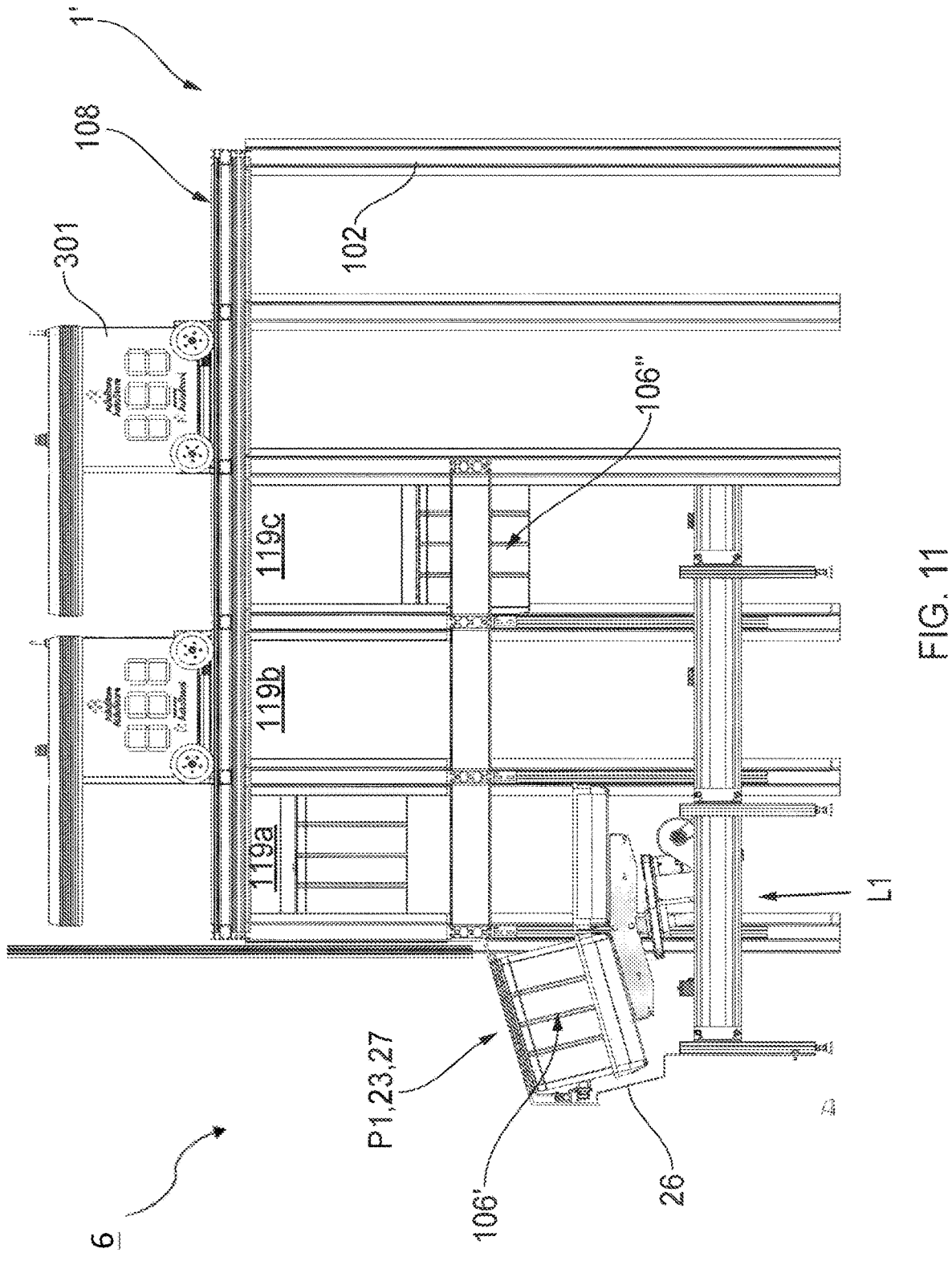
FIGS. 11-13 are side views of a second exemplary access station according to the invention comprising the container handling module in FIG. 9.

In FIG. 11, a first storage container 106' is presented at the access position 23 by having the first storage container 106' supported on the first container holder 8a of the at least one container holder module 13', the first container holder 8a is arranged in the first angular position P1, and the shuttle 14 is arranged in the first linear position L1. Any required picking/stocking of items from/to the first storage container is performed by a human operator or robot.

The shuttle 14 is then moved to the second linear position L2. A second storage container 106" is loaded onto the second container holder 8b when arranged in the second angular position P2 and the first and second container holder are rotated around the axis of rotation C to arrange the first container holder 8a in the second angular position P2 and the second container holder 8b in the first angular position P1.

Figure 12:
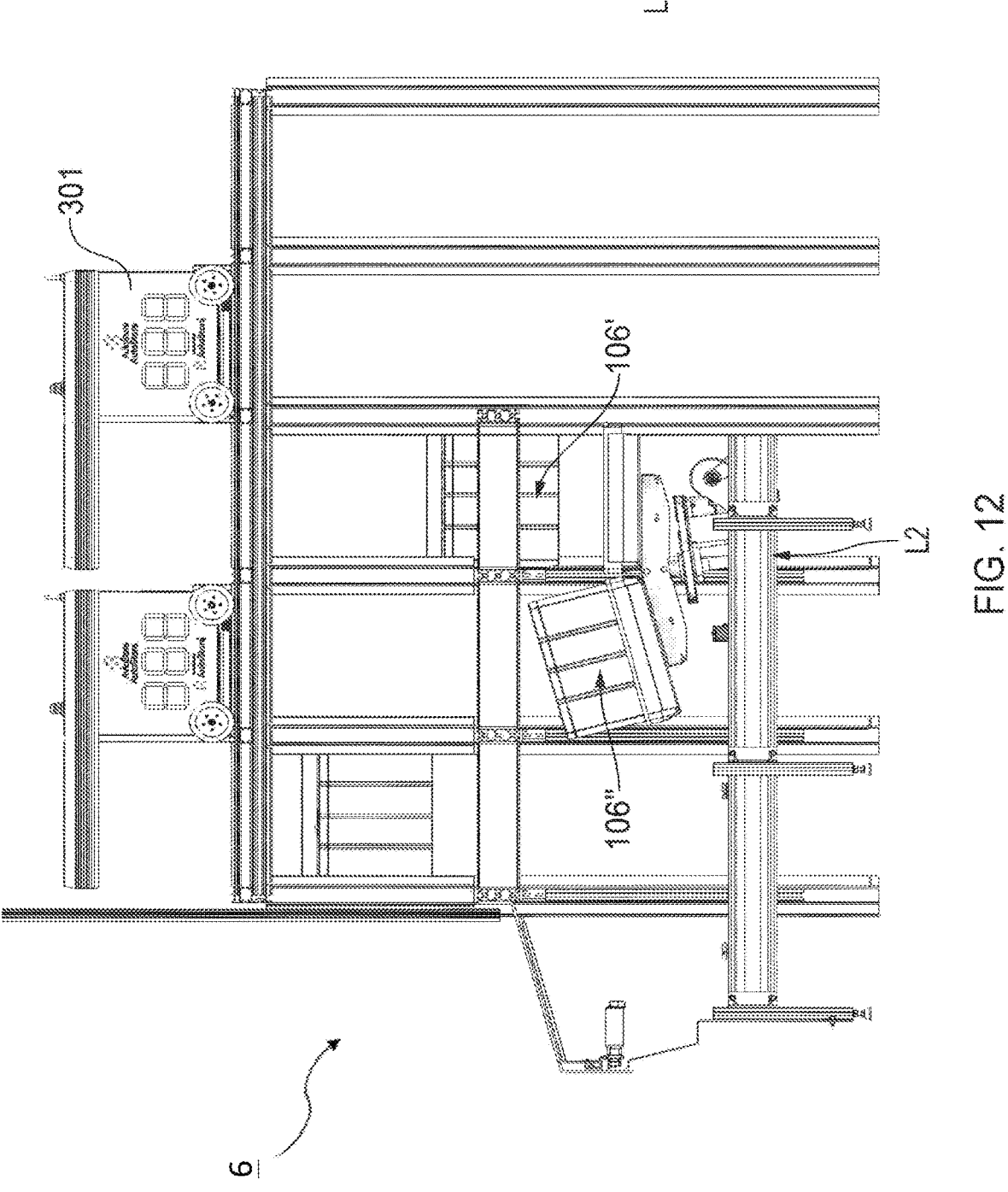
Figure 13:
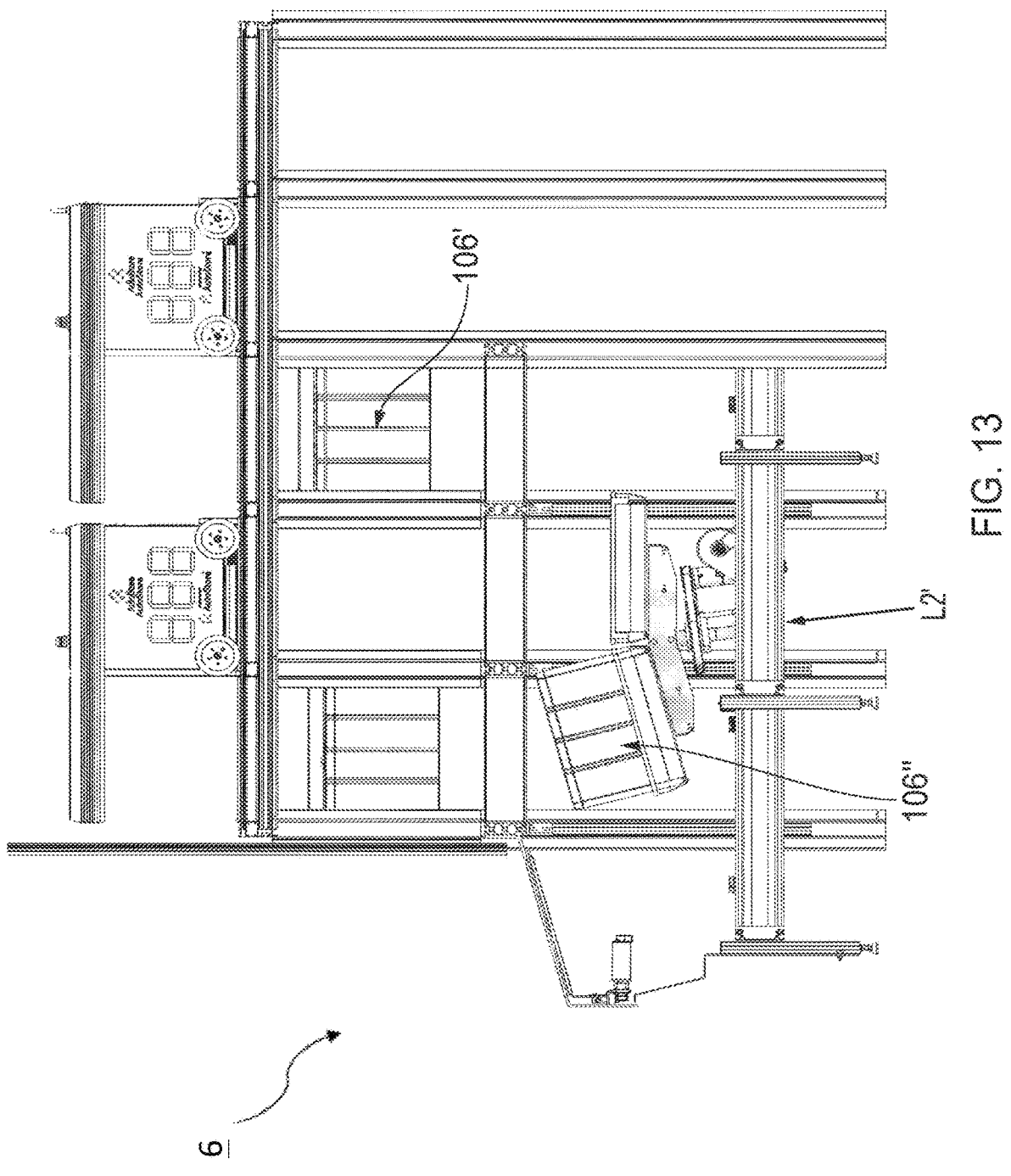
Figure 14:
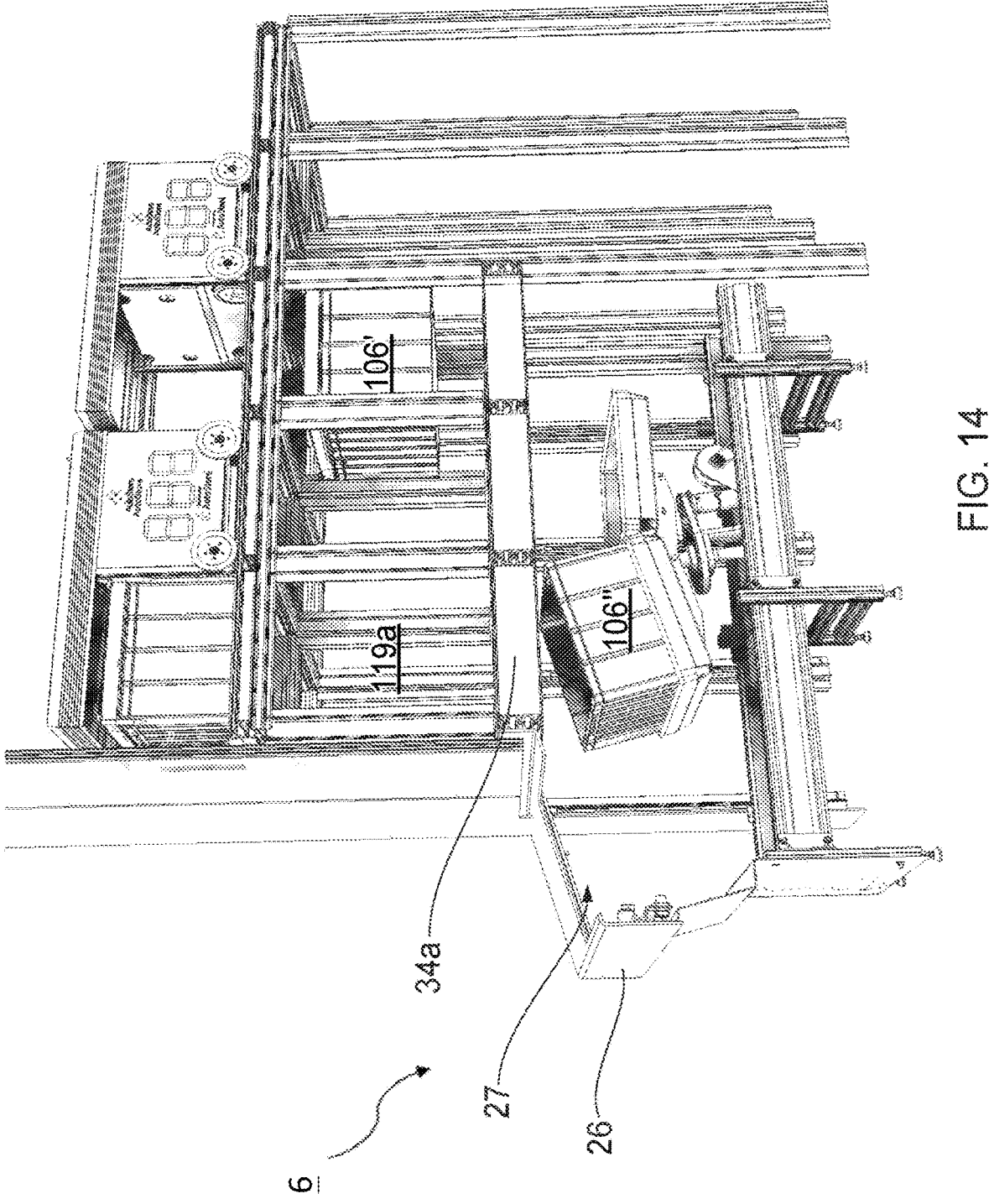
FIG. 14 is a perspective view of the access station in FIGS. 11-13.

FIG. 12 shows the first storage container 106' being unloaded from the first container holder 8a by use of a container handling vehicle 301 operating on the rail system 108. In FIGS. 13 and 14, the shuttle 14 is moved towards the first linear position L1 in which the second storage container 106" may be presented at the access position 23. The combination of the rotational and linear movements of the container holders 8a,8b provides a highly flexible access station, wherein storage containers 106 may be retrieved or delivered to any of the container holders in any preferred sequence that provides the most efficient presentation and exchange of storage containers at the access position 23. In addition, one of the storage containers may hold a frequently picked item and this arrangement of the container handling module 13/access station may allow repeated picking of the item for different orders without having to return the storage container 106', 106".

Figure 15:
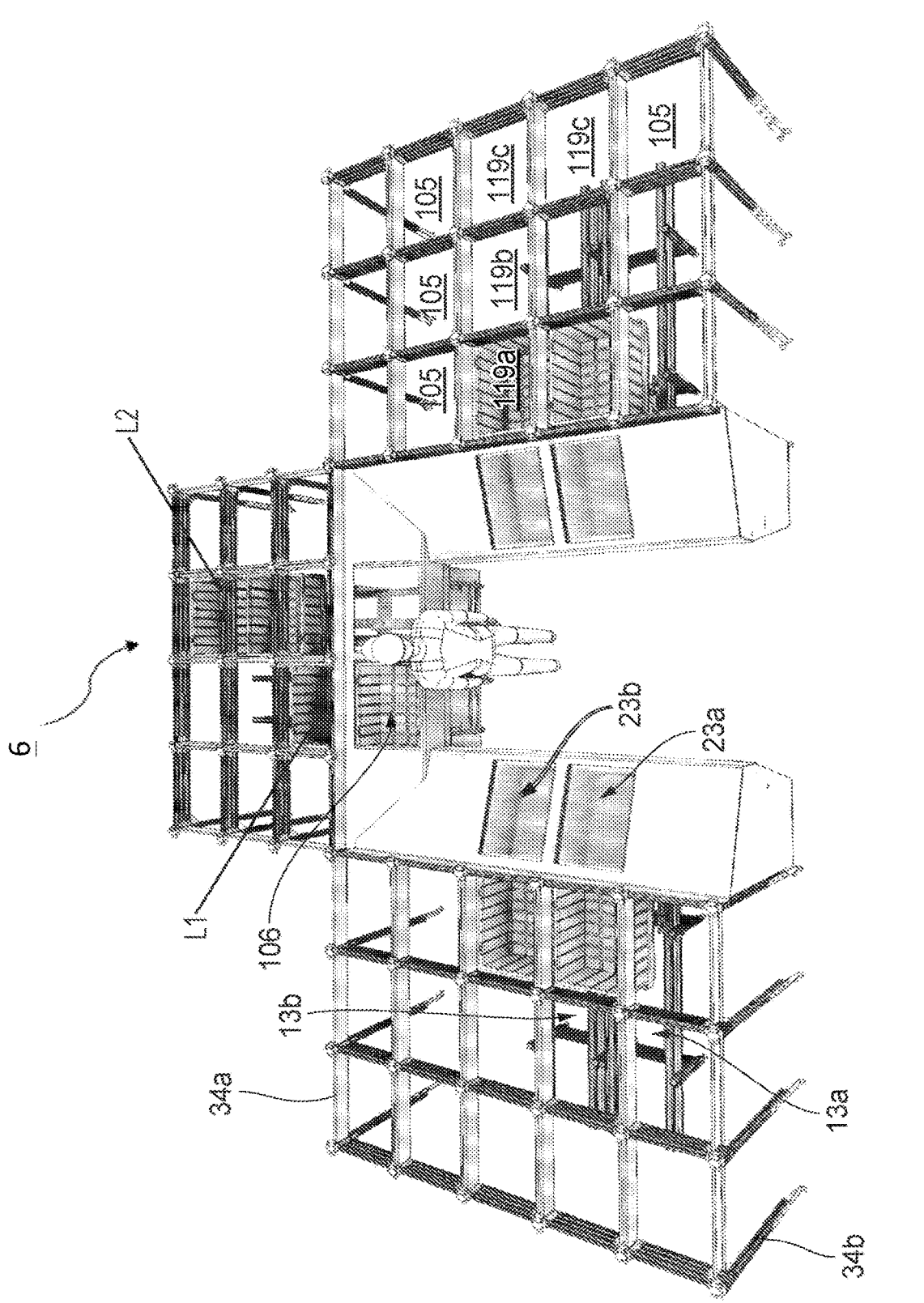
FIGS. 15-17 are perspective views of a third exemplary access station according to the invention comprising a plurality of container handling modules as shown in FIGS. 5-8.
Figure 16:
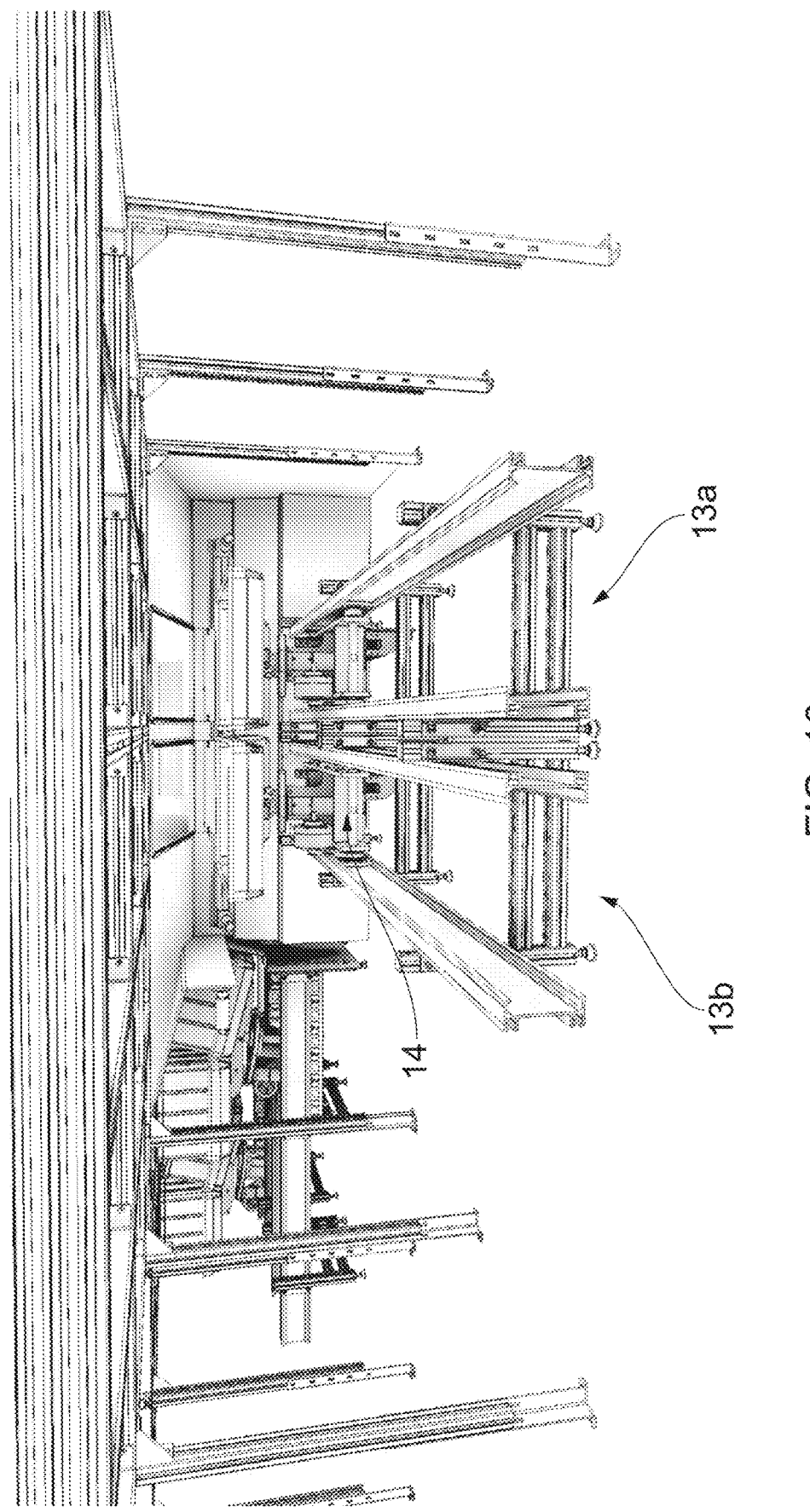
Figure 17:
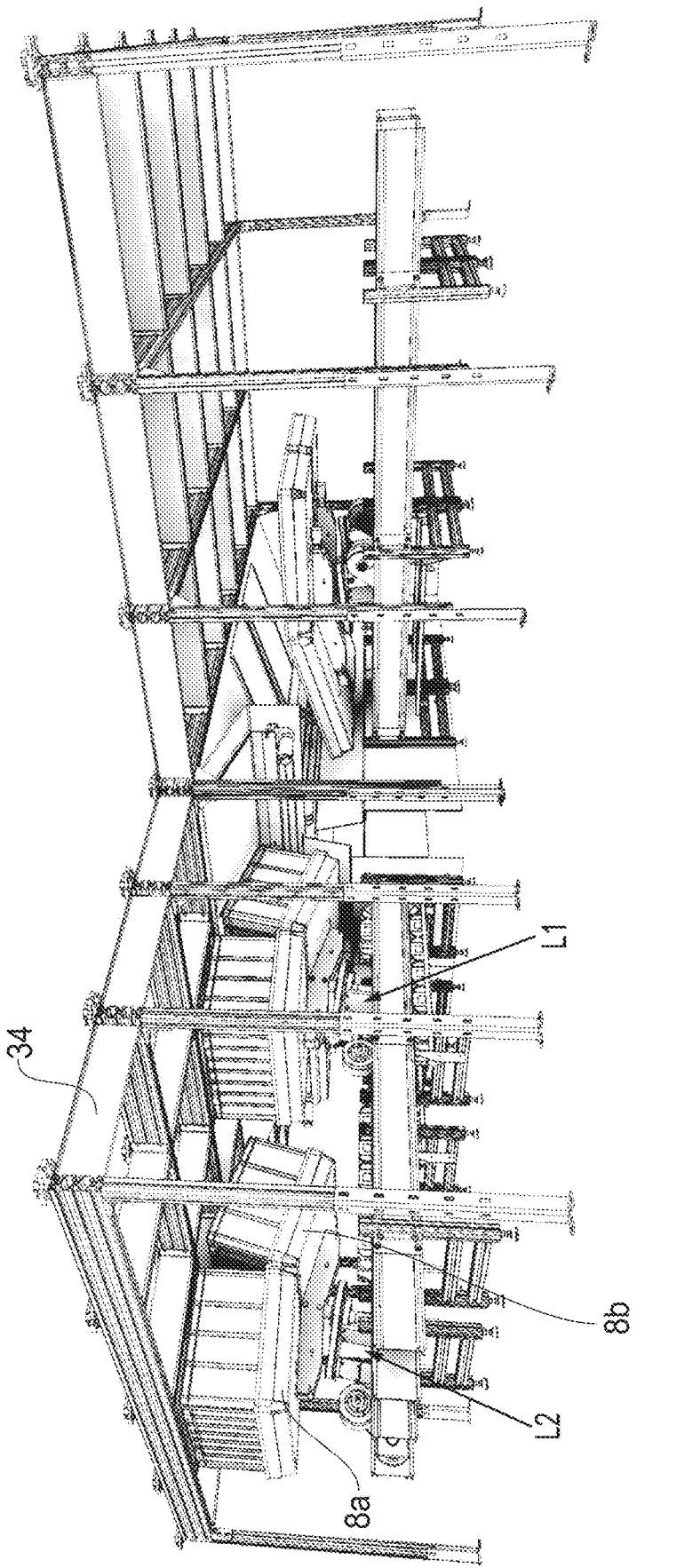

A further exemplary access station according to the invention is shown in FIGS. 15-17. The access station features three similar sets of two container handling modules 13a, 13b. Each set provides two separate access positions 23a, 23b and corresponds to a dual version of the access stations disclosed in FIGS. 10-14. The provision of two adjacent access positions is made possible by the moveable shuttle 14. When two container handling modules 13a,13b are arranged in parallel, i.e. the respective rail assemblies 15,16 are parallel and adjacent, the container holders 8a,8b of the two container handling modules 13a,13b are not able to rotate around their respective axis of rotation C when the respective shuttles 14 are in the same linear position. Thus, to retrieve and present a storage container 106 at the first access position 23a, the shuttle 14 of the first container handling module 13a is first moved to the second linear position L2, while the shuttle 14 of the second container handling module 13b is in the first linear position L1. The storage container is then loaded onto the first or second container holder 8a,8b being in the second angular position P2. The first and second container holders 8a,8b of the first container handling module 13a is then rotated around the axis of rotation C to move the first or second container holder, on which the storage container is loaded, to the first angular position P1. The shuttle 14 of the first container handling module 13a is finally moved to the first linear position L1 to present the storage container at the access position of the first container handling module 13a. When the first container handling module 13a is arranged to present the storage container, the second container handling module 13b may move to retrieve another storage container for subsequent presentation at its respective access position 23b.

The station framework 34a,34b of the access station is an extended version of the station framework described above. When the access station is incorporated into a storage system 1 as described above, the first and second container handling modules are arranged such that the respective container holders are separated by a distance substantially corresponding to the width of the rails making up the horizontal top rail grid 108.

Figure 18:
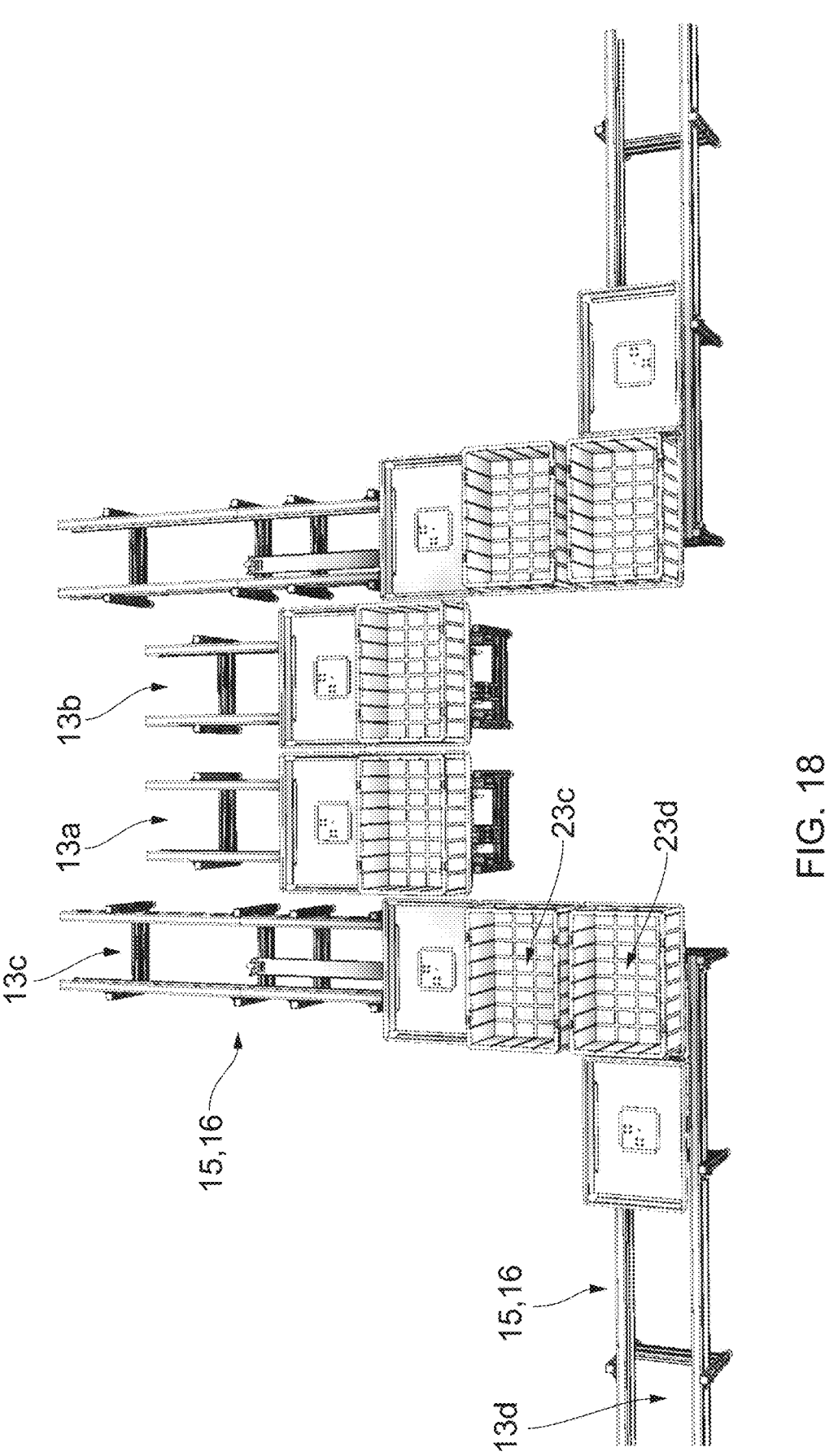
FIG. 18 is a perspective top view of a fourth exemplary access station according to the invention.

FIG. 18 shows a further exemplary access station according to the invention, wherein two adjacent access positions 23c,23d are obtained by arranging the rail assemblies 15,16 of a third container handling module 13c and a fourth container handling module in a perpendicular relationship.

It is noted that the inventive container handling module may be used to provide a large variety of various access station configurations. For instance, the second linear position of a container handling module may be arranged at any desired distance from the first linear position (or access position in an access station) depending on the travel length of the shuttle.

The invention claimed is:

1. A container handling module for an access station in a storage system,
    the container handling module comprises a first container holder, a second container holder, and a shuttle,
    the first and second container holders are rotatably mounted to the shuttle via a rotary shaft, wherein
    each of the first and second container holders is arranged to accommodate a storage container and is rotatable around an axis of rotation between a first angular position and a second angular position, the second angular position being opposite the first angular position relative to a centreline of the rotary shaft, and
    the shuttle being configured for movement in between a first position and a second position,
    wherein the axis of rotation is inclined at a first angle relative to a vertical, and each of the first container holder and the second container holder is configured such that a centreline of an accommodated storage container when supported by the respective container holder is inclined at a second angle relative to the axis of rotation.

2. The container handling module according to claim 1 further comprising a rail assembly, wherein the rail assembly comprises two parallel rails and a support framework.

3. The container handling module according to claim 2, wherein each of the two parallel rails has a cross-section comprising guide surfaces, the guide surfaces arranged to interact with the shuttle to restrict vertical movement of the shuttle relative to the rail assembly.

4. The container handling module according to claim 2, wherein the shuttle comprises a set of wheels in contact with the rail assembly and configured to allow movement of the shuttle between the first position and the second position relative to the rail assembly.

5. The container handling module according to claim 2, wherein the shuttle may move between a first end and a second end of the rail assembly.

6. The container handling module according to claim 5, wherein either of the first container holder or the second container holder being in the first angular position is arranged at the first end of the rail assembly when the shuttle is in the first position.

7. The container handling module according to claim 1, wherein the shuttle may move linearly for a distance being at least equal to a horizontal distance between the axis of rotation and a distal portion of the first container holder or the second container holder.

8. The container handling module according to claim 1, wherein the first container holder is in the first angular position when the second container holder is in the second angular position.

9. The container handling module according to claim 1, wherein the shuttle may move to at least one intermediate linear position arranged between the first position and the second position.

10. The container handling module according to claim 5, wherein
    the centreline of an accommodated storage container is vertical when in the second angular position and inclined at a third angle relative to the vertical when in the first angular position, the third angle being equal to the sum of the first angle and the second angle.

11. The container handling module according to claim 10, wherein the axis of rotation is inclined towards the first end of the rail assembly.

12. An access station comprising at least one container handling module according to claim 2, wherein the container handling module is arranged to present a storage container at an access position of the access station, at which access position an operator or robot has access to the storage container when the storage container is supported by either the first or the second container holder being in the first angular position and the shuttle is in the first position.

13. The access station according to claim 12, wherein the container handling module is arranged to allow a storage container to be provided to or retrieved from either the first or the second container holder, when the respective container holder is in the second angular position and the shuttle is in the second position.

14. The access station according to claim 12, wherein the container handling module is arranged to allow a storage container to be provided to or retrieved from either the first or the second container holder, when the respective container holder is in the second angular position and the shuttle is in any of the first position and the second position.

15. The access station according to claim 12, wherein the first and second container holder may rotate around the axis of rotation when the shuttle is in the second position.

16. The access station according to claim 12, the access station further comprising a cabinet within which a first end of the rail assembly of the at least one container handling module is arranged, the cabinet comprises an access opening arranged to be aligned with the access position.

17. The access station according to claim 12 for a storage system featuring at least one port column, through which port column storage containers may be transferred in a vertical direction, and wherein the access station comprises a station framework configured for supporting the lower ends of the at least one port column above the rail assembly.

18. The access station according to claim 17, wherein the storage system has a plurality of port columns, and the station framework is configured for supporting the lower ends of the plurality of port columns above the rail assembly.

19. A storage system comprising an access station according to claim 12, wherein the storage system features at least one port column, through which port column storage containers may be transferred in a vertical direction, the at least one port column is arranged above the rail assembly of the at least one container handling module of the access station such that a storage container may be delivered to, or retrieved from, the first or second container holder via the port column when the first or second container holder is arranged in the second angular position and the shuttle is in the second position.

20. A method of presenting a storage container for access at an access station according to claim 12, comprising:
    moving the shuttle to the second position;
    loading the storage container onto the first or second container holder being in the second angular position;

rotating the first and second container holders around the axis of rotation to move the first or second container holder, on which the storage container is loaded, to the first angular position; and
moving the shuttle to the first position to present the storage container at the access position.

21. A method of exchanging a storage container at an access position of an access station according to claim 12, comprising:
    presenting a first storage container at the access position by having the first storage container supported on the first container holder of the at least one container holder module, the first container holder arranged in the first angular position, and the shuttle arranged in the first position;
    moving the shuttle to the second position and loading a second storage container onto the second container holder arranged in the second angular position;
    rotating the first and second container holder around the axis of rotation to arrange the first container holder in the second angular position and the second container holder in the first angular position;
    optionally unloading the first storage container from the first container holder;
    moving the shuttle to the first position and presenting the second storage container at the access position.

22. The access station according to claim 12, the access station further comprising a first container handling module and a second container handling module, wherein the rail assemblies of the first and second container handling modules are arranged in parallel, or perpendicular to each other, to provide two adjacent access positions.

23. The access station according to claim 22, wherein the first and second container holder of the first container handling module may rotate around the axis of rotation when the shuttle of the first container handling module is in the second position and the shuttle of the second container handling module is in the first position.

24. The method of presenting a storage container for access at an access station according to claim 22, comprising:
    moving the shuttle of the first container handling module to the second position, while the shuttle of the second container handling module is in the first position;
    loading the storage container onto the first or second container holder, of the first container handling module, being in the second angular position;
    rotating the first and second container holders of the first container handling module around the axis of rotation to move the first or second container holder, on which the storage container is loaded, to the first angular position; and
    moving the shuttle of the first container handling module to the first position and presenting the storage container at a first access position.

* * * * *